US009864901B2

(12) United States Patent
Chang

(10) Patent No.: US 9,864,901 B2
(45) Date of Patent: Jan. 9, 2018

(54) FEATURE DETECTION AND MASKING IN IMAGES BASED ON COLOR DISTRIBUTIONS

(71) Applicant: Google Inc., Mountain View, CA (US)

(72) Inventor: Jason Chang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 168 days.

(21) Appl. No.: 14/855,297

(22) Filed: Sep. 15, 2015

(65) Prior Publication Data

US 2017/0076142 A1    Mar. 16, 2017

(51) Int. Cl.
*G06K 9/00* (2006.01)
*G06K 9/62* (2006.01)
*G06T 7/40* (2017.01)
*G06T 7/11* (2017.01)

(52) U.S. Cl.
CPC ....... *G06K 9/00281* (2013.01); *G06K 9/6202* (2013.01); *G06K 9/627* (2013.01); *G06K 9/6212* (2013.01); *G06K 9/6277* (2013.01); *G06T 7/11* (2017.01); *G06T 7/408* (2013.01); *G06T 2207/10024* (2013.01); *G06T 2207/30201* (2013.01)

(58) Field of Classification Search
CPC .. G06K 9/00208–9/00295; G06T 7/10–7/194; G06T 2207/30201
See application file for complete search history.

(56) References Cited

U.S. PATENT DOCUMENTS

| 4,203,671 | A  | 5/1980  | Takahashi       |
|-----------|-----|---------|-----------------|
| 6,263,113 | B1 | 7/2001  | Abdel-Mottaleb  |
| 6,282,317 | B1 | 8/2001  | Luo et al.      |
| 6,332,038 | B1 | 12/2001 | Funayama et al. |

(Continued)

FOREIGN PATENT DOCUMENTS

| CN | 1975762 A | 6/2007 |
|----|-----------|--------|
| EP | 1453002   | 9/2004 |

OTHER PUBLICATIONS

SIPO, Office Action (with English translation) for Chinese Patent Application No. 201480035737.5, dated Oct. 17, 2016, 6 pages.

(Continued)

*Primary Examiner* — Aaron W Carter
(74) *Attorney, Agent, or Firm* — IP Spring

(57) ABSTRACT

Implementations relate to image feature detection and masking in images based on color distributions. In some implementations, a computer-implemented method to determine a mask for an image includes determining a spatial function for a detected feature depicted in the image, the function indicating pixels of the image relative to an estimated feature boundary. A respective color likelihood distribution is determined for each of multiple regions of the image based on one or more distributions of color values in the regions, including a feature region and a non-feature region. A confidence mask is determined based on the spatial function and one or more of the color likelihood distributions. The confidence mask indicates, for each of multiple pixels of the image, an associated confidence that the pixel is a feature pixel. A modification is applied to pixels in the image using the confidence mask.

20 Claims, 14 Drawing Sheets

(56) References Cited

U.S. PATENT DOCUMENTS

| | | | |
|---|---|---|---|
| 6,690,822 | B1 | 2/2004 | Chen |
| 7,215,828 | B2 | 5/2007 | Luo |
| 7,587,083 | B2 | 9/2009 | Tabata |
| 7,916,905 | B2 | 3/2011 | Yen |
| 8,218,862 | B2 | 7/2012 | Demirli |
| 8,295,557 | B2 | 10/2012 | Wang |
| 8,311,355 | B2 | 11/2012 | Brunner |
| 8,345,114 | B2 | 1/2013 | Ciuc et al. |
| 8,384,791 | B2 | 2/2013 | Porter et al. |
| 8,385,609 | B2 | 2/2013 | Piramuthu |
| 8,406,482 | B1 | 3/2013 | Chien et al. |
| 8,638,993 | B2 | 1/2014 | Lee et al. |
| 8,644,600 | B2 | 2/2014 | Yang et al. |
| 8,698,796 | B2 | 4/2014 | Mochizuki |
| 8,983,152 | B2 | 3/2015 | Lewis et al. |
| 9,189,886 | B2 | 11/2015 | Black et al. |
| 9,256,950 | B1* | 2/2016 | Xu ..................... G06K 9/00281 |
| 9,547,908 | B1* | 1/2017 | Kim ........................... G06T 5/20 |
| 2003/0174869 | A1* | 9/2003 | Suarez .................... G06T 11/60 382/118 |
| 2003/0223622 | A1* | 12/2003 | Simon ................ G06K 9/00281 382/118 |
| 2004/0170337 | A1* | 9/2004 | Simon ................ G06K 9/00234 382/254 |
| 2007/0110305 | A1 | 5/2007 | Corcoran |
| 2009/0041297 | A1 | 2/2009 | Zhang |
| 2009/0196475 | A1* | 8/2009 | Demirli .................. A61B 5/441 382/128 |
| 2011/0299776 | A1 | 12/2011 | Lee et al. |
| 2013/0044947 | A1 | 2/2013 | Brandi |
| 2013/0044958 | A1* | 2/2013 | Brandt ............... G06K 9/00248 382/201 |
| 2013/0077823 | A1 | 3/2013 | Mestha |
| 2013/0169827 | A1* | 7/2013 | Santos ............... H04N 5/23229 348/207.1 |
| 2013/0329995 | A1 | 12/2013 | Webb et al. |
| 2014/0341442 | A1* | 11/2014 | Lewis ................ G06K 9/00248 382/118 |
| 2016/0140383 | A1* | 5/2016 | Kim ................... G06K 9/00234 382/118 |
| 2016/0154993 | A1* | 6/2016 | Aarabi ....................... G06T 7/11 382/118 |
| 2016/0284070 | A1* | 9/2016 | Pettigrew ................. G06T 5/008 |
| 2017/0076142 | A1* | 3/2017 | Chang ................ G06K 9/00281 |

OTHER PUBLICATIONS

USPTO, Notice of Allowance for U.S. Appl. No. 14/868,332, dated Sep. 14, 2016, 8 pages.

European Patent Office, International Search Report and Written Opinion for International Patent Application No. PCT/US2016/051740, dated Dec. 5, 2016, 12 pages.

USPTO, Ex Parte Quayle Action for U.S. Appl. No. 14/868,332, dated Jun. 27, 2016, 7 pages.

International Bureau of WIPO, International Preliminary Report on Patentability for related International Patent Application No. PCT/US2014/037934, dated Nov. 17, 2015, 8 pages.

USPTO, Notice of Allowance for related U.S. Appl. No. 13/894,384, dated Nov. 12, 2014, 7 pages.

USPTO, Final Office Action for U.S. Appl. No. 14/200,000, dated Aug. 5, 2015, 13 pages.

USPTO, Non-Final Office Action for U.S. Appl. No. 14/200,000, dated Apr. 16, 2015, 27 pages.

European Patent Office (EPO), International Search Report for International Patent Application No. PCT/US2014/037934, dated Feb. 10, 2014, 4 pages.

Jones, Michael J. et al., "Statistical Color Models with Application to Skin Detection", International Journal of Computer Vision, vol. 46, Jan. 1, 2002, pp. 81-96.

Kim, Junmo et al., "A Nonparametric Statistical Method for Image Segmentation Using Information Theory and Curve Evolution", IEEE Transactions on Image Processing, vol. 14, No. 10, Oct. 2005, pp. 1486-1502.

Long, Jonathan et al., "Fully Convolutional Networks for Semantic Segmentation", Cornell Univ. Library, arXiv:1411.4038v2, Mar. 8, 2015, 10 pages.

Saeed, Usman et al., "Combining Edge Detection and Region Segmentation for Lip Contour Extration", AMDO'10 Proceedings of the 6th International conference on Articulated Motion and Deformable Objects, 2010, 10 pages.

USPTO, Notice of Allowance for U.S. Appl. No. 14/200,000, dated Oct. 15, 2015, 10 pages.

SIPO, Second Office Action (with English translation) for Chinese Patent Application No. 201480035737.5, dated May 8, 2017, 7 pages.

SIPO, Third Office Action (with English translation) for Chinese Patent Application No. 201480035737.5, dated Sep. 20, 2017, 16 pages.

\* cited by examiner

FEATURE DETECTION AND MASKING IN IMAGES BASED ON COLOR DISTRIBUTIONS

BACKGROUND

The popularity and convenience of digital cameras as well as the widespread of use of Internet communications have caused user-produced images such as photographs to become ubiquitous. For example, users of Internet platforms and services such as email, forums, photograph repositories, and network services post images for themselves and others to view. Images can be posted by users to a network service for private viewing (e.g., friends or other small groups of users) and/or public viewing by many users. Images can be edited by users in various ways, e.g., using image editing programs to manually edit images.

SUMMARY

Implementations generally relate to feature detection and masking in images based on color distributions. In some implementations, a computer-implemented method to determine a mask for an image includes determining a spatial function for a detected feature depicted in the image, where the spatial function selects pixels of the image relative to a feature boundary estimated from the detected feature. A respective color likelihood distribution is determined for each region of a plurality of regions of the image based on one or more distributions of color values in each of the regions, where the regions include a feature region and a non-feature region. A confidence mask is determined based on the spatial function and one or more of the color likelihood distributions, where the confidence mask indicates, for each of a plurality of pixels of the image, an associated confidence that the pixel is a feature pixel. A modification is applied to pixels in the image using the confidence mask.

Various implementations and examples of the method are described. For example, the detected feature can be a detected skin feature, e.g., facial skin included in a detected face, or other feature depicting skin. The confidence mask can be based on a posterior probability mask, and determining the spatial function can include determining a prior probability mask for the detected feature. The prior probability mask can be based on the feature boundary and indicates, for each of a plurality of pixels in the image, an associated first probability that the pixel is a feature pixel. The posterior probability mask can be based on the prior probability mask and the one or more color likelihood distributions and indicates, for each of the plurality of pixels of the image, an associated second probability that the pixel is a feature pixel.

Determining the confidence mask can include multiplying the prior probability mask with at least one of the color likelihood distributions. In another example in which the detected feature is a skin feature, determining a confidence mask can include determining a posterior feature mask indicating, for each of a plurality of pixels of the image, an associated probability that the pixel is a skin feature pixel, determining a posterior non-feature mask indicating, for each of a plurality of pixels of the image, an associated probability that the pixel is not a skin feature pixel, and determining the confidence mask based on the posterior feature mask and the posterior non-feature mask. The posterior probability feature mask can be based on the color likelihood distribution for the feature region, and the posterior non-feature mask can be based on at least one of the color likelihood distributions for the non-feature region. For example, determining the confidence mask can include determining a ratio of the posterior feature mask to the posterior non-feature mask.

The method can further include blurring the spatial function, where determining the confidence mask is based on the blurred spatial function. The detected feature can be facial skin included in a detected face, where the face can include one or more detected facial landmarks, where the feature boundary is a face boundary estimated based on the one or more detected facial landmarks. The method can further include determining the face boundary using a machine learning technique that determines the face boundary based on positions of the one or more detected facial landmarks, where the machine learning technique is trained with a plurality of training images having face boundaries indicated.

Determining a respective color likelihood distribution for each region can include determining a region segmentation of the image based on the feature boundary, where the region segmentation indicates a plurality of regions including the feature region and the non-feature region of the image. The distributions of color values can be determined for pixels of the image in each of the regions of the region segmentation, and the respective color likelihood distribution for each of the regions can be determined based on one or more of the distributions of color values for the regions. In some implementations, the distributions of color values can include histograms, and the histograms can be normalized. The method can further include blurring one or more of the distributions of color values. For example, blurring the distributions of color values can include blurring values of the distributions along an axis for which color values for different color channels are approximately equal.

In some examples, the plurality of regions can include one or more facial landmark regions different than the non-feature region, and can include at least one of: a mouth region, an eye region, and an eyebrow region, where a respective color likelihood distribution can be determined for each of the one or more facial landmark regions. In some examples, the confidence mask can be based on a posterior feature mask and a posterior non-feature mask, where the posterior non-feature mask is based on multiplying the prior probability mask with a combination of the color likelihood distributions for the non-feature region and for the facial landmark regions.

In some implementations, a system to determine a mask for an image includes a storage device and at least one processor operative to access the storage device and configured to determine a respective color likelihood distribution for each region of a plurality of regions of the image based on one or more distributions of color values in each of the regions, where the regions include a feature region and a non-feature region. The processor is configured to determine a probability feature mask for the detected feature at least based on the color likelihood distribution for the feature region, where the probability mask indicates, for each of a plurality of pixels of the image, an associated probability that the pixel is a feature pixel. The processor is configured to determine a probability non-feature mask for the detected feature at least based on the color likelihood distribution for the non-feature region, where the probability mask indicates, for each of a plurality of pixels of the image, an associated probability that the pixel is not a feature pixel. The processor is also configured to determine a resulting confidence mask based on the probability feature mask and the probability non-feature mask, and apply a modification to color values of pixels in the image using the resulting probability mask.

Various implementations and examples of the system are described. For example, the distributions of color values can include histograms, and the processor can be further configured to blur each the histograms. The image feature can be facial skin included in a detected face, and the plurality of regions can include one or more facial landmark regions which can include a mouth region, an eye region, and/or an eyebrow region, for example. The processor can be configured to determine a respective color likelihood distribution for each of the one or more facial landmark regions, and determine the probability non-feature mask for the detected face at least based on the color likelihood distribution for the non-feature region and the color likelihood distributions for the one or more facial landmark regions.

In some implementations, a non-transitory computer readable medium having stored thereon software instructions to determine a skin mask for an image and, when executed by a processor, cause the processor to perform operations. The operations include determining a prior probability mask for a detected skin feature depicted in the image, where the prior probability mask is based on a skin feature boundary estimated from the detected skin feature, and the prior probability mask indicates, for each of a plurality of pixels in the image, an associated first probability that the pixel is a skin feature pixel. The operations include determining a respective color likelihood distribution for each region of a plurality of regions of the image based on one or more distributions of color values in each of the regions, where the regions include a skin feature region and a non-feature region. The operations include determining a posterior probability mask for the detected skin feature based on the prior probability mask and the color likelihood distributions, where the posterior probability mask indicates, for each of a plurality of pixels of the image, an associated second probability that the pixel is a skin feature pixel. The operations include applying a modification to pixels in the image based on the posterior probability mask. Various implementations and examples of the computer readable medium are described. For example, the one or more distributions of color values can include histograms, and the operations can further include blurring each of the histograms.

In some implementations, a system to determine a mask for an image includes means for determining a spatial function for a detected feature depicted in the image, where the spatial function selects pixels of the image relative to a feature boundary estimated from the detected feature. The system includes means for determining a respective color likelihood distribution for each region of a plurality of regions of the image based on one or more distributions of color values in each of the regions, where the regions include a feature region and a non-feature region. The system includes means for determining a confidence mask based on the spatial function and one or more of the color likelihood distributions, where the confidence mask indicates, for each of a plurality of pixels of the image, an associated confidence that the pixel is a feature pixel. The system includes means for applying a modification to pixels in the image using the confidence mask.

Various implementations and examples of the system are described. For example, the detected feature can be a detected skin feature, e.g., facial skin included in a detected face, or other feature depicting skin. The confidence mask can be based on a posterior probability mask, and the means for determining the spatial function can include means for determining a prior probability mask for the detected feature. The prior probability mask can be based on the feature boundary and indicates, for each of a plurality of pixels in the image, an associated first probability that the pixel is a feature pixel. The posterior probability mask can be based on the prior probability mask and the one or more color likelihood distributions and indicates, for each of the plurality of pixels of the image, an associated second probability that the pixel is a feature pixel.

The means for determining the confidence mask can include means for multiplying the prior probability mask with at least one of the color likelihood distributions. In another example in which the detected feature is a skin feature, means for determining a confidence mask can include means for determining a posterior feature mask indicating, for each of a plurality of pixels of the image, an associated probability that the pixel is a skin feature pixel, means for determining a posterior non-feature mask indicating, for each of a plurality of pixels of the image, an associated probability that the pixel is not a skin feature pixel, and means for determining the confidence mask based on the posterior feature mask and the posterior non-feature mask. The posterior probability feature mask can be based on the color likelihood distribution for the feature region, and the posterior non-feature mask can be based on at least one of the color likelihood distributions for the non-feature region. For example, means for determining the confidence mask can include means for determining a ratio of the posterior feature mask to the posterior non-feature mask.

The system can further include means for blurring the spatial function, where the means for determining the confidence mask uses the blurred spatial function. The detected feature can be facial skin included in a detected face, where the face can include one or more detected facial landmarks, where the feature boundary is a face boundary estimated based on the one or more detected facial landmarks. The system can further include means for determining the face boundary using a machine learning technique that determines the face boundary based on positions of the one or more detected facial landmarks, where the machine learning technique is trained with a plurality of training images having face boundaries indicated.

The means for determining a respective color likelihood distribution for each region can include determining a region segmentation of the image based on the feature boundary, where the region segmentation indicates a plurality of regions including the feature region and the non-feature region of the image. The means for determining a respective color likelihood distribution can determine distributions of color values for pixels of the image in each of the regions of the region segmentation, and can determine the respective color likelihood distribution for each of the regions based on one or more of the distributions of color values for the regions. In some implementations, the distributions of color values can include histograms, and the histograms can be normalized. The system can further include means for blurring one or more of the distributions of color values. For example, means for blurring the distributions of color values can include means for blurring values of the distributions along an axis for which color values for different color channels are approximately equal.

DETAILED DESCRIPTION

Figure 1:
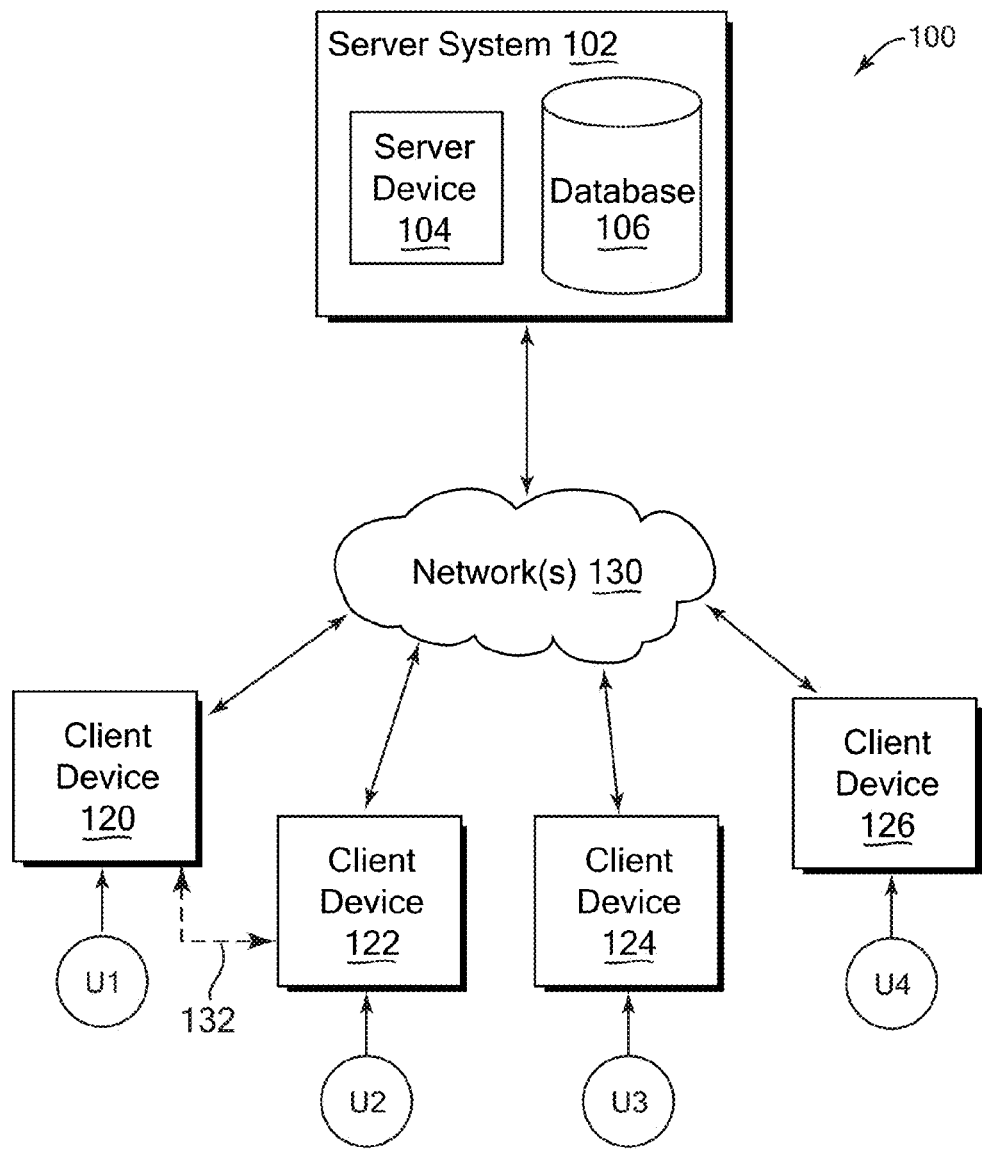
FIG. 1 is a block diagram of an example network environment which may be used for one or more implementations described herein.

One or more implementations described herein relate to image feature detection and masking in images based on color distributions, e.g., skin detection and masking In some examples, the intended image feature to be masked can be a skin feature, such as facial skin included in a detected face, or other body portion depicting skin. Some examples systems can obtain an image depicting one or more detected features, e.g., facial skin of one or more faces, or other features depicted in the image. In some implementations, a system can determine a confidence mask for each of one or more detected features, where the mask indicates a confidence whether each pixel in the image is a feature pixel. The confidence mask can be based on color likelihood distributions for a plurality of regions of the image, including a feature region (e.g., a region of facial skin) and one or more non-feature regions (e.g., regions not depicting facial skin). Using the confidence mask, modifications can be applied to the pixels of the feature in the image, e.g., to change color values of one or more pixels of the feature. Modifications can alternately or additionally be applied to color values of pixels not included in the feature.

For example, in some implementations, the system can determine a spatial function for the detected feature that indicates or selects pixels of the image relative to a feature boundary estimated from the detected feature. For example, if the feature is facial skin of a face, the spatial function can be based on an ellipse used as a skin feature boundary. In some implementations, determining the spatial function can include determining a prior probability mask indicating pixels that are feature pixels. Some implementations can blur the spatial function, such that the confidence mask is based on the blurred spatial function.

In various implementations, the color likelihood distributions can be determined for regions of the image based on one or more distributions of color values in each of those regions. For example, a feature region (e.g., a facial skin region) can be an area of a face determined to be within a detected face based on detected facial landmarks such as eyes, eyebrows, nose, and mouth. A non-feature region can be an area of the image outside the facial region, e.g., a background region. Other non-feature regions can also or alternatively be used, including non-skin facial landmark regions within the spatial boundary, e.g., eye regions, eyebrow regions, and/or a mouth region determined for corresponding non-skin facial landmarks. The color likelihood distributions can be based on one or more distributions of color values in each of the regions, e.g., where the distributions can be histograms in some implementations. For example, a distribution of colors in the facial skin region, a distribution of colors in the non-feature region (e.g., background region), and distributions of colors in the non-feature facial landmark regions (e.g., eye regions, eyebrow regions, and/or mouth region) can be determined. Some implementations can blur the distributions of color values. For example, the distributions can be blurred, e.g., increasing a range of colors represented for one or more of the regions as compared to before the blurring. For example, the blurring can include blurring each of the color channels, and/or blurring values of the distributions along an axis for which color values for different color channels are approximately equal (e.g., an axis along which red channel values, green channel values, and blue channel values are approximately equal in an RGB color space). Some implementations can interpolate between discrete values in the color value distributions.

Some implementations can determine the confidence mask as a resulting inferred confidence mask that is based on the spatial function as a prior probability mask and one or more of the color likelihood distributions. For example, a posterior probability mask can be determined by multiplying the prior probability mask with at least one of the color likelihood distributions. In some implementations, a resulting inferred confidence mask for the detected skin feature can be based on a posterior feature mask and a posterior non-feature mask, e.g., a ratio of the posterior feature mask to the posterior non-feature mask. The posterior feature mask can indicate probabilities that associated pixels are feature pixels, and the posterior non-feature mask can indicate probabilities that associated pixels are not feature pixels.

Various described features can allow a system to determine a mask that indicates probabilities that pixels of an image depict a particular feature, e.g., a skin feature. For example, described features can provide accurate indication of which pixels in an image are facial skin pixels, allowing accurate application of image modifications to facial skin areas and/or to areas of the image that are not depicting facial skin. For example, image modifications (e.g., performed by one or more edit operations to an image) such as a blur operation can perform smoothing on facial skin pixels, e.g., removal or reduction of skin blemishes as desired by a user. Use of the facial skin mask allows such facial skin smoothing without blurring background areas as well as eyes, eyebrows, hair, mouth, or other non-skin areas. Other skin features or image features can be similarly modified by one or more edit operations to images using a determined mask.

Described features can allow skin pixels (or other feature pixels) of an image to be automatically, quickly, and accurately identified in a determined pixel mask. For example, described features can provide a prior probability mask adapted to a feature in an image based on landmarks, such as a face based on facial landmarks, allowing accurate identification of feature pixels such as facial skin pixels. Trained techniques can determine an accurate feature boundary (e.g., face boundary) based on trained data. In some implementations, determination of a mask value for each image pixel can be performed independently of other mask values and can be efficiently parallelized. Features can utilize a comparison (e.g., ratio) between feature and non-feature pixels that allows reduction of false positives compared to techniques using no knowledge of background pixels and other non-feature pixels. Furthermore, distributions of color values (e.g., histograms) can be used which can be more representative of image area colors than a set of samples or a single Gaussian. Blurring of color value distributions can allow a greater range of color values to be represented in each region, e.g., allowing more accurate probability or confidence determination for pixels that may have color values close to the color values of high-probability or high-confidence pixels. Using one or more described features, downsizing of the image may not be needed for the image processing since the processing speed is efficient and fast, allowing greater accuracy with faster processing.

A system using one or more features described herein can provide accurate and quality results. The system can reduce user time and effort by automatically applying modifications to image pixels based on the feature or non-feature status of the pixels, and by avoiding tedious manual editing of images to apply desired modifications to image features such as faces. Furthermore, described features can reduce the processing resources needed for storage and editing of images that may otherwise need to be performed manually.

In situations in which the systems and methods discussed herein may collect personal information about users, or may make use of personal information (e.g., user data), users are provided with one or more opportunities to control how information is collected about the user and used in one or more described features. A user is provided with control over whether programs or features collect user data (e.g., information about a user's social network, user characteristics (age, gender, profession, etc.), social actions or activities, a user's preferences, content created or submitted by a user, a user's current location, etc.). A user is provided with control over whether programs or features collect user information about that particular user or other users relevant to the program or feature. Each user for which personal information is to be collected is presented with one or more options to allow control over the information collection relevant to that user, to provide permission, consent, or authorization as to whether the information is collected and as to which portions of the information are to be collected. For example, users can be provided with one or more control options over a communication network. In addition, certain data may be treated in one or more ways before it is stored or used, so that personally identifiable information is removed. For example, a user's identity may be treated so that no personally identifiable information can be determined for the user, or a user's geographic location may be generalized to a larger region so that a particular location of a user cannot be determined.

An "image" as referred to herein can be a still image, single image, or standalone image, or can be an image included in a series of images, e.g., a frame in a video sequence of video frames, or an image in a different type of sequence of images. For example, implementations described herein can be used with single images or with one or more images from one or more series or video sequences of images.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., a social network service or other type of network service, implemented on server system 102. For example, respective client devices 120, 122, 124, and 126 may communicate data to and from one or more server systems (e.g., system 102). In some implementations, the server system 102 may provide appropriate data to the client devices such that each client device can receive communicated content or shared content uploaded to the server system 102 and/or network service. In some implementations, a "user" can include one or more programs or virtual entities, as well as persons that interface with the system or network.

A user interface can enable display of images, video, data, and other content as well as communications, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide an image editing program and/or an image display program. The image editing program may allow a system (e.g., client device or server system) to provide options for editing and displaying an image, some examples of which are described herein. The image editing program can provide an associated user interface that is displayed on a display device associated with the server system or client device. The user interface may provide various options to a user to select images and editing options, editing modes, display modes, etc. for one or more images.

Other implementations of features described herein can use any type of system and/or service. For example, photo collection services or other networked services (e.g., connected to the Internet) can be used instead of or in addition to a social networking service. Any type of electronic device can make use of features described herein. Some implementations can provide features described herein on client or server devices disconnected from or intermittently connected to computer networks. In some examples, a client device including or connected to a display device can examine and display images stored on storage devices local to the client device (e.g., not connected via a communication network) and can provide features and results as described herein that are viewable to a user.

Figure 2:
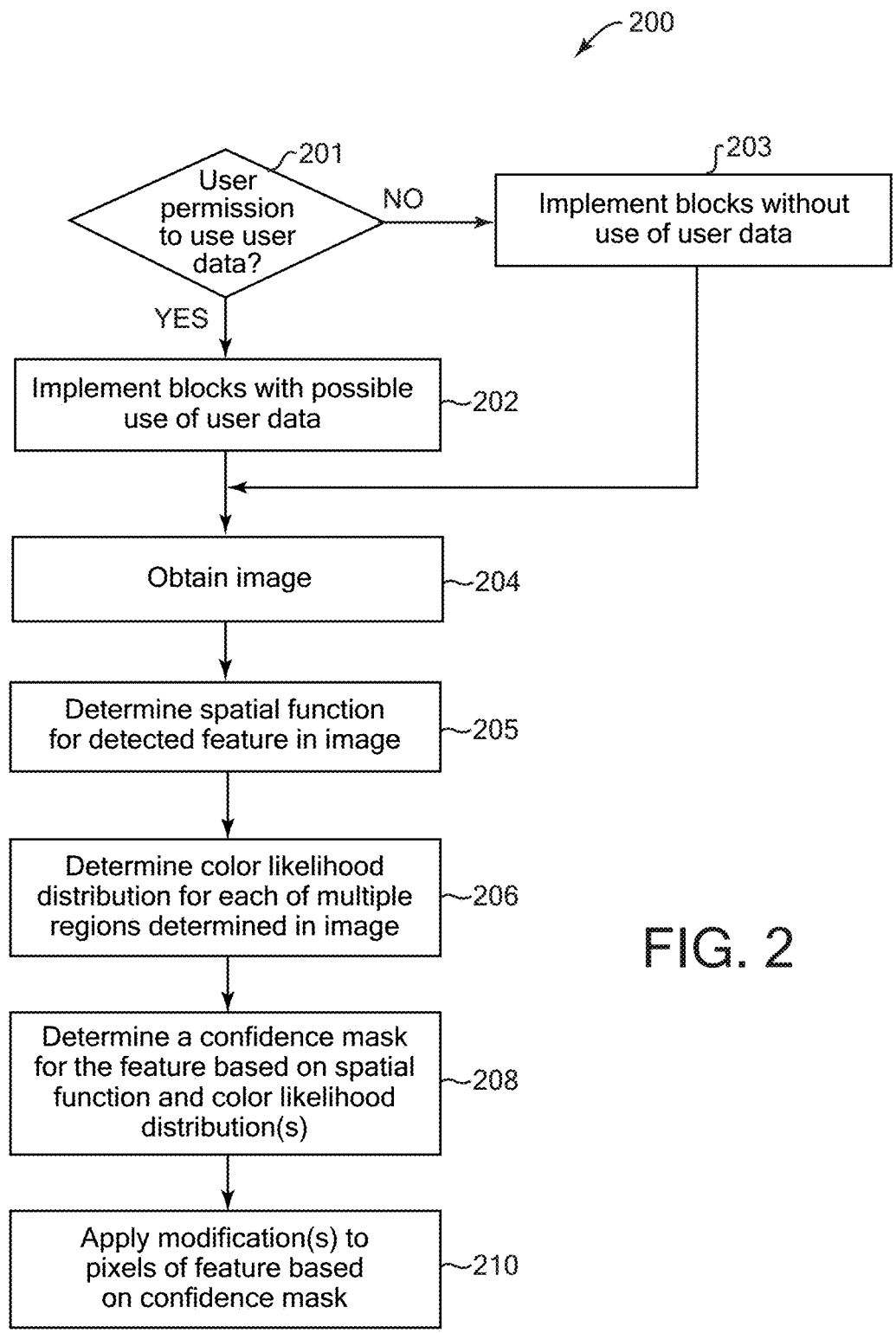
FIG. 2 is a flow diagram illustrating an example method to determine a mask for an image, according to some implementations.

FIG. 2 is a flow diagram illustrating one example of a method 200 to determine a mask for a feature depicted in an image. The mask can be determined for any image feature depicted in an image. For example, method 200 and examples herein can refer to a skin feature, which can be an image feature (e.g., object or area) in the image which depicts skin, such as facial skin of a face, a portion of a face, skin of a face and neck area, a body part or portion depicting skin, etc. The mask can be determined for other image features in other implementations, e.g., portion or part of an animal, landscape feature, object, monument, etc.

In some implementations, method 200 can be implemented, for example, on a server system 102 as shown in FIG. 1. In other implementations, some or all of the method 200 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 200.

Some implementations can initiate method 200 based on user input. A user may, for example, have selected the initiation of the method 200 from a displayed user interface. In some implementations, method 200 or portions thereof can be performed with guidance by the user via user input.

In some implementations, the method 200, or portions of the method, can be initiated automatically by a system. For example, the method (or portions thereof) can be periodically performed, or performed based on one or more particular events or conditions, e.g., an application being opened by a user, receiving one or more images that have been newly uploaded to or accessible by the system, a predetermined time period having expired since the last performance of method 200, and/or one or more other conditions occurring which can be specified in settings of a system. In some implementations, such conditions can be specified by a user in stored custom preferences of the user (accessible with user permission). In one example, a server system can receive one or more input images uploaded from one or more users, and can perform the method 200 for the newly-uploaded images. In another example, a system (server or client) can perform the method 200 for a large collection of accessible images, e.g., a user's collection of images (if user permission is received). In another example, a camera, cell phone, tablet computer, wearable device, or other client device can capture an image and can perform the method 200. In addition or alternatively, a client device can send one or more captured images to a server over a network, and the server can process the images using method 200.

In block 201, it is checked whether user permission has been obtained to use user data in the implementation of method 200. For example, user data can include user preferences, information about a user's social network and contacts, user characteristics (identity, name, age, gender, profession, etc.), social and other types of actions and activities, content, ratings, and opinions created or submitted by a user, a user's current location, historical user data, etc. One or more blocks of the methods described herein can use such user data in some implementations. If user permission has been obtained from the relevant users for which user data may be used in the method 200, then in block 202, it is determined that the blocks of the methods herein can be implemented with possible use of user data as described for those blocks, and the method continues to block 204. If permission has not been obtained, it is determined in block 203 that blocks are to be implemented without use of user data, and the method continues to block 204. In some implementations, if user permission has not been obtained, the remainder of method 200 is not performed.

In block 204 of method 200, the an image is obtained for processing. The image can be a digital image composed of multiple pixels, for example, and can be stored on one or more storage devices of the system or otherwise accessible to the system, e.g., a connected storage device such as a local storage device, storage device connected to or in communication with a network accessible to the system, etc. For example, the image can be a photo captured by a camera, an image frame extracted from a captured video stream or other video data, or an image derived from a different source.

In some implementations, a user can provide, select, or designate one or more images to obtain for processing. In some implementations, the image can be automatically obtained by the method, e.g., as an image from a stored collection of multiple images, e.g., from a user's album, a pool of stored images submitted by users, etc. Automatic obtaining of an image from a user's collection is performed with the user's permission as indicated in block 202, e.g., via stored user preferences accessed by block 204. The collections can be locally stored and accessible by the system performing method 200, and/or can be remotely stored on a server or client device, e.g., as one or more albums provided in account(s) of user(s) of a network service. In some implementations, the system can determine which image to select based on evaluating one or more characteristics of accessible images, e.g., timestamps and other metadata of images, the color distributions of images, the recognized content or labels describing content in images, user data such as user preferences, etc. (accessed with user permission).

For example, in some implementations, a system can automatically (e.g., without human intervention) select a particular image for processing. For example, such selection may be determined (with user permission) based on user data, including stored user preferences, a user history of previous modifications made by the user to other images, social data indicating user preferences (e.g., previous comments, ratings, etc. made by the user), recent or upcoming events based on the user's stored calendar or planner, locations visited or to be visited by the user (e.g. as detected by GPS sensors on a device carried by the user), activities of the user (e.g., sensed or inferred by locations visited by the user), etc.

In block 205, a spatial function is determined for a detected feature in the image, which is a desired image feature for which the mask is to be determined. For example, the feature can be one of multiple features detected in the image intended for a mask. For example, the feature can be detected based on one or more image recognition techniques, e.g., facial recognition techniques, body recognition techniques, object recognition techniques, etc. as described below for FIG. 3. The spatial function can be a function that indicates pixels of the image relative to a feature boundary estimated from the detected feature. For example, the spatial function can approximately indicate which pixels of the image are feature pixels depicting the desired feature. For example, in some implementations the spatial function can provide a pixel map indicating the feature pixels and non-feature pixels, and/or can indicate a shape within which are the feature pixels.

In some implementations, the spatial function can indicate a feature boundary that has been estimated based on the detected feature. In some examples, the feature boundary can be estimated as an ellipse, a circle, a polygon, an irregular shape, etc. For example, if the detected feature is facial skin of a face, the face may include positions of facial landmarks within a detected face area, such as eyes, eyebrows, nose, and mouth. Other landmarks can be detected and used in some implementations (e.g., hair, etc.). These facial landmark positions can be used to estimate the feature boundary. In some implementations, the feature boundary can be determined based on machine learning techniques, e.g., trained using multiple training images. Some examples of determining a skin feature boundary are described below. Other types of features may include other types of landmarks, such as points of a body portion that can be used to detect that body portion in an image (e.g., endpoints of fingers to detect a hand, position or centers of joints to detect an arm or a leg, belly button to detect a torso, etc.).

In some implementations, determining the spatial function can include determining a prior probability mask for the detected feature. The prior probability mask can be based on the feature boundary and can indicates, for each pixel in the image (or for each pixel in one or more portions of the image), an associated probability that the pixel is a feature pixel. Some examples of determining the spatial function for a detected skin feature are described below with respect to FIG. 3.

In block 206, a color likelihood distribution is determined for each of multiple regions determined in the image. A color likelihood distribution can be a probability distribution of colors occurring in a particular region that has been segmented in the image. In some implementations, regions can be segmented based on the detected feature, with one or more of the regions being feature regions and one or more of the regions being non-feature regions. For example, if the detected feature (and desired mask feature) is facial skin of a face, one or more of the segmented regions can be feature regions that are assumed to depict at least a portion of the facial skin in the image. Other regions that are segmented in the image can include one or more non-feature regions, e.g., a background region of the image outside facial skin or other skin feature. In some implementations, additional regions of the image can be segmented. For example, eyes, eyebrows, and mouth of the face can be segmented as different non-feature regions that do not depict the feature of facial skin.

A color likelihood distribution can be determined for each such segmented region. For example, in some implementations, each color likelihood distribution can be derived from a distribution of color values in the associated region, e.g., a histogram of the color values in the associated region. In some implementations, each color likelihood distribution can be a likelihood mask corresponding to the image (or one or more portions of the image). Some examples of determining one or more color likelihood distributions are described below with reference to FIG. 4.

In block 208, a confidence mask is determined for the feature based on the spatial function and one or more of the color likelihood distributions. For example, the confidence mask can be a pixel map that indicates, at each of a plurality of pixels of the image, an associated confidence (e.g., confidence value or level) that the pixel is a feature pixel. In some examples, the confidence mask can be, or can be based on, a probability mask indicating an associated probability at each of a plurality of pixels that the pixel is a feature pixel. For example, the confidence mask can be based on a posterior probability feature mask (also referred to as a posterior feature mask) and a posterior probability non-feature mask (also referred to as a posterior non-feature mask). For example, the posterior feature mask can be a posterior facial skin mask and the posterior non-feature mask can be a posterior non-facial-skin mask. For example, the posterior feature mask can use the color likelihood distribution for the determined feature region to find feature-colored pixels within the image, and use the spatial function for a prior probability mask for limiting the feature-colored pixels to a particular feature spatial area of the image. For example, in some implementations, the confidence mask can indicate skin pixels of a face depicted in the image. Some implementations can provide a confidence mask that indicates skin feature pixels depicting non-facial portions of a person's exposed skin on their body, e.g., neck, bare arms or legs of the person, etc. Some examples of determining a confidence mask, e.g., an inferred confidence mask, are described below with reference to FIG. 5.

In block 210, one or more modifications are applied to the pixels of the feature in the image using the confidence mask of block 208, e.g., based on the confidence mask. For example, the modifications can be applied to the color values of the feature using one or more edit operations (e.g., applying one or more filters, etc.). In some implementations, each pixel value (e.g., confidence value) of the confidence mask can indicate a degree or strength of modification for the corresponding pixel of the input image. In some implementations, the confidence mask can be used as a binary mask, e.g., where each pixel of the mask indicates whether or not the associated pixel of the input image depicts the detected skin feature. This binary indication can allow a system to determine which (if any) pixels of the image should be modified. For example, confidence values (or probabilities) in the mask that are above a threshold value can be considered to indicate that the associated pixels are feature pixels, and confidences below the threshold confidence can be considered to indicate that the associated pixels are non-feature pixels. For example, a confidence mask for facial skin can indicate non-feature pixels for pixels depicting facial landmarks such as eyes, eyebrows, and mouth. This allows adjustment to the facial skin pixels to be performed without modifying other facial non-skin areas.

In some examples, any of various modifications can be applied to the image, including blurring, contrast adjustment (e.g., applying local contrast), brightness adjustment, saturation adjustment, luminance adjustment, etc. In some implementations or cases, the modifications can be applied to the feature pixels of the image using the confidence mask. Some implementations or cases can apply one or more of the modifications to non-feature pixels of the image using the confidence mask. For example, if the feature is facial skin, modifications can be applied to background pixels outside a detected face, and/or eyes, hair, mouth, etc. of the face, and/or skin areas outside the particular skin feature masked by the confidence mask. Some implementations can apply one or more of the modifications differently (e.g., at different magnitudes or other parameters) to feature pixels and to non-feature pixels.

In some implementations, multiple features can be detected in the image obtained in block 202. If multiple such features are detected, blocks 205 to 208 can be performed for each detected feature, in some implementations. For example, multiple faces may be detected in the image and a confidence mask can be determined for the facial skin of each such face, or for a subset of the detected faces. In some implementations, the same or different modifications can be applied to the image using different confidence masks. For example, one type or magnitude of blur modification can be applied to facial skin of one face in the image using one confidence mask determined for that face, and a different type or magnitude of blur modification can be applied to facial skin of a different face in the image using a different confidence mask determined for that facial skin. Some implementations can include multiple features (e.g., for multiple faces) in a single confidence mask of block 208.

In various implementations, the modified image resulting from block 210 can be stored on one or more accessible storage devices. The modified image can be caused to be otherwise output by a system, e.g., displayed on a display screen, transmitted to another system via a communications network, etc.

Figure 3:
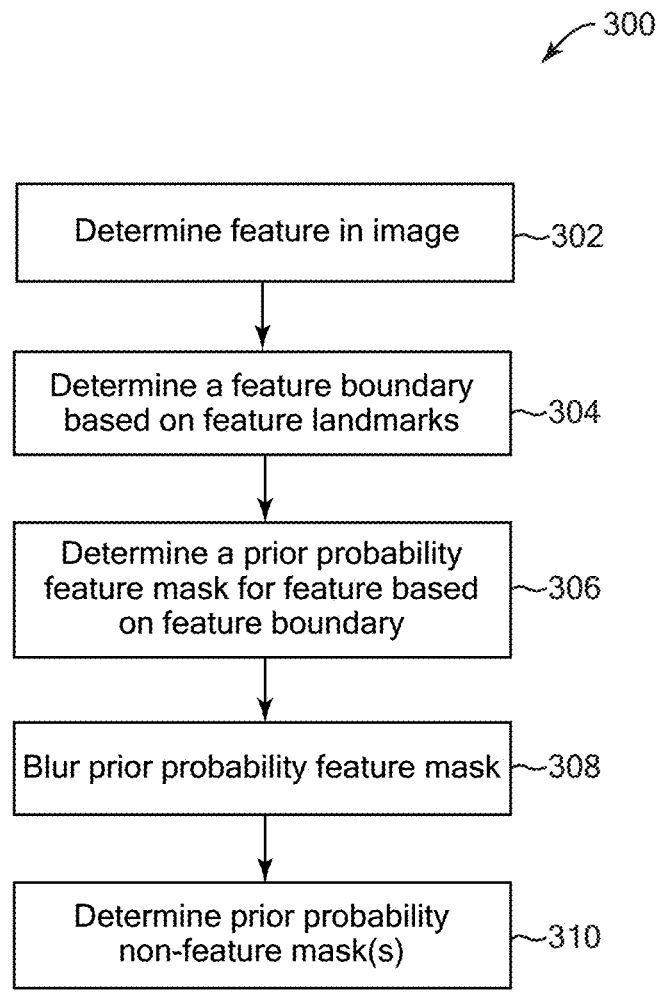
FIG. 3 is a flow diagram illustrating an example method to determine a spatial function for a detected feature in an image, according to some implementations.

FIG. 3 is a flow diagram illustrating an example method 300 to determine a spatial function for a detected feature in an image, e.g., for block 205 of FIG. 2. Other methods can alternatively be used for block 205.

In block 302, a feature is determined in the image. In some examples of FIG. 3, the feature is a skin feature (e.g., object or area) in the image which depicts skin, such as facial skin of a face, a portion of a face, a body part or portion depicting skin, etc. Other types of features can be determined and processed in other implementations. For example, the skin feature can be detected, e.g., identified or recognized in the image, and can be one of multiple skin features detected in the image. For example, the skin feature can be detected based on one or more image recognition techniques. In various implementations, method 300 can perform the image recognition techniques and/or send the obtained image to a recognizer implemented on the system or a connected system, and receive recognition results from the recognizer.

In some examples, the skin feature is facial skin of a face, and one or more facial recognition techniques can be used to detect the face of the facial skin. For example, some facial recognition techniques can examine the image to find facial landmarks such as eyes, eyebrows, nose, and mouth to detect a face in an image. In various implementations, facial recognition techniques can examine an image for facial landmarks having a particular position, profile, and/or spatial relationship with each other and/or with other identifiable features (such as other head features, body features, etc.), examine and compare image portions to general reference pattern images, and/or perform other techniques to detect faces in images. The facial recognition techniques can detect a face in an image without determining the identity of the person who is depicted. For example, general facial features in the image can be detected to determine the position of a general face, without determining any person identity or characteristics or user data associated with the face. For example, if no permission was obtained by the users whose faces are detected, this general facial detection can be used.

Some facial recognizers can provide face location data such as coordinates of a face region, e.g., a face polygon (or other shape) surrounding a detected face portion, where the polygon has segments approximately bordering a detected face based on identified facial landmarks. In some implementations, facial information besides face location data can be determined. For example, the facial recognition techniques can provide points or other locations of the facial landmarks found in the face for the facial identification process. For example, spatial coordinates of points on one or more of the facial landmarks can be provided, such as the mid-point of each eye, points indicating the spatial extent of the eye (e.g., left and right endpoints of the eyes, centered top and bottom points of the eyes, etc.), points indicating the spatial extent of the mouth, a mid-point of the nose, a center point of a chin, etc. In addition, information can be provided which indicates an identified angle of orientation of the face relative to the plane of the image, such as whether the face is being depicted directly facing the plane of the image or a magnitude of angle of the face looking to a specified side or direction. Such an angle can be estimated, for example, based on locations of the facial landmarks with respect to each other and to other facial features.

Some implementations may determine an identity and/or other characteristics of a person (e.g., user) associated with a detected face, if user permission was obtained from the user whose identity is determined. In some implementations, user permission data associated with an identified user is consulted to determine whether the method 300 has permission to perform the processing of the method on the detected face. Access to personal information including user characteristics such as age, gender, identity, etc., is restricted based on users' control and preferences governing such information. Identities and other user characteristics are not determined for faces (or other depicted features of persons) for which such permission is not received. In some implementations, if user permission is obtained, characteristic information can be provided about the associated person whose face was identified, such as estimated age, gender, and other characteristics of the person. In some implementations, such information can be used in determining whether to process the image. In some examples, a facial recognition technique can identify a face and recognize the identity of the person being depicted based on permissibly-obtained user data and/or data from a social networking service or other network service, data service, or storage, and from the identity the system may be able to determine age, gender, and/or other user characteristics. In some other examples, such characteristic information can be determined without determining the identity of the depicted person.

In some implementations, the skin feature determined in block 302 can be a skin feature other than facial skin of a face. For example, one or more skin features of a human body can be detected, e.g., body appendage portions including exposed skin portions of arms, legs, torsos, hands, feet, etc. Some techniques can examine the image for a full human body, or a portion of a human body, based on known patterns and/or orientations of various body appendages, e.g., based on a skeleton model or other model. For example, some techniques can detect a full human body or portion thereof, and portions of the detected body can be detected as exposed skin, e.g., based on detection of known shapes for these portions, and/or based on detection of other shapes (e.g., face or hand skin) and checking for similar colors on the remainder of the detected body. In some implementations, a recognition technique can exclude non-skin areas of a detected body, e.g., based on detecting clothing worn on the detected person as indicated by shape, texture, color, etc. Some techniques can determine a user identity or other identity of a detected feature, if user permission has been obtained from the relevant user.

In block 304, a feature boundary is determined for the detected feature. For example, the feature boundary can be a skin feature boundary, e.g., a face boundary for a skin feature that is facial skin. The boundary can be determined using any of multiple different techniques. In some examples, a skin feature boundary can be determined based on one or more feature landmarks determined for the skin feature. For example, an ellipse, polygon, or other standardized shape can be centered or otherwise positioned to define the boundary of a face as estimated based on its distance to facial landmarks such as eyes, nose, and mouth.

In some implementations, one or more machine learning techniques can be used to estimate the feature boundary. For example, for a facial skin feature boundary, a number of training images depicting faces can be altered to include an ellipse (or other shape) that is manually added (e.g., by users) over the faces in the images to approximately define a face area. A machine learning technique can be fed the training images to learn how to place an ellipse over a newly detected face to approximately bound the entire face in the ellipse, e.g., based on distances between the ellipse and facial landmark positions, face and ellipse orientations, etc. Some implementations can determine a skin boundary shape to place over other types of detected skin features, e.g., based on averaged relative distances, training images, etc.

In block 306, a prior probability feature mask is determined for the detected feature based on the feature boundary determined in block 304. The prior probability feature mask can be a pixel map indicating an estimated probability, at each of a plurality of pixels of the mask, of the associated pixel of the image being a feature pixel. For example, in some implementations the prior probability feature mask can provide probabilities for all of the corresponding pixels of the image, or for one or more portions of the image covering less than the entire area of the image.

The prior probability feature mask can be estimated based on the feature boundary. For example, the prior probability feature mask can be a prior probability skin mask that can indicate a high probability of a skin pixel for pixels in one or more regions located within the skin feature boundary, and a low probability of a skin pixel for pixels in one or more regions outside the skin feature boundary. In some examples, if the skin feature boundary is an ellipse estimated to surround a skin feature that is facial skin, the prior probability feature mask can have high-probability pixels within a corresponding ellipse shape and low-probability pixels outside the ellipse shape. In some examples, the high probability mask pixels can indicate 100% probability for the associated pixel to be a skin feature pixel, and the low probability mask pixels can indicate 0% probability for the associated pixel to be a skin feature pixel.

In block 308, the prior probability feature mask is blurred. For example, the edges of the feature boundary used to determine the prior probability feature mask can be blurred to provide a gradual transition of probabilities from one side of the boundary to the other side of the boundary in the prior probability feature mask. In some examples, if the prior probability feature mask shows an ellipse having the high-probability pixels, the edges or border area of the ellipse can be blurred such that the probabilities of mask pixels gradually change from high-probability pixels inside the ellipse to low-probability pixels outside the ellipse, e.g., with gradually reducing probabilities. Other types of blurs or gradients can be used on the prior probability feature mask in some implementations. Some implementations can blur the feature boundary before the prior probability feature mask is created based on the boundary, thereby including a blurred edge to a boundary region in the prior probability feature mask.

In block 310, one or more prior probability non-feature masks may be determined in some implementations. For example, a prior probability non-feature mask for an estimated background area of the image can be an inverse of a prior probability feature mask determined in blocks 306 and 308. The prior probability non-feature mask includes mask pixels that indicate an estimated probability that corresponding image pixels are not skin feature pixels, e.g., not facial skin pixels if the skin feature is facial skin.

In some implementations, a prior probability non-feature mask can also be determined for each of one or more other non-feature areas detected in the image. For example, if the feature is a facial skin feature, such non-feature areas can include particular facial landmarks (e.g., eyes, eyebrows, and mouth). In one example, a prior probability non-feature mask for eye regions can have lighter shaded pixels for the estimated eye regions to indicate a high probability of those regions being non-skin regions, and darker shaded pixels for all other areas of the image. Similarly, a prior probability non-feature mask for a mouth region can have lighter shaded pixels for the estimated mouth region and darker shaded pixels for the other areas of the image. Facial landmark regions in a prior non-feature mask can be blurred similarly as described above for block 308. In some implementations, multiple facial landmark prior masks can be combined with each other and/or with the background prior non-feature mask to provide a combined prior probability non-feature mask.

Figure 4:
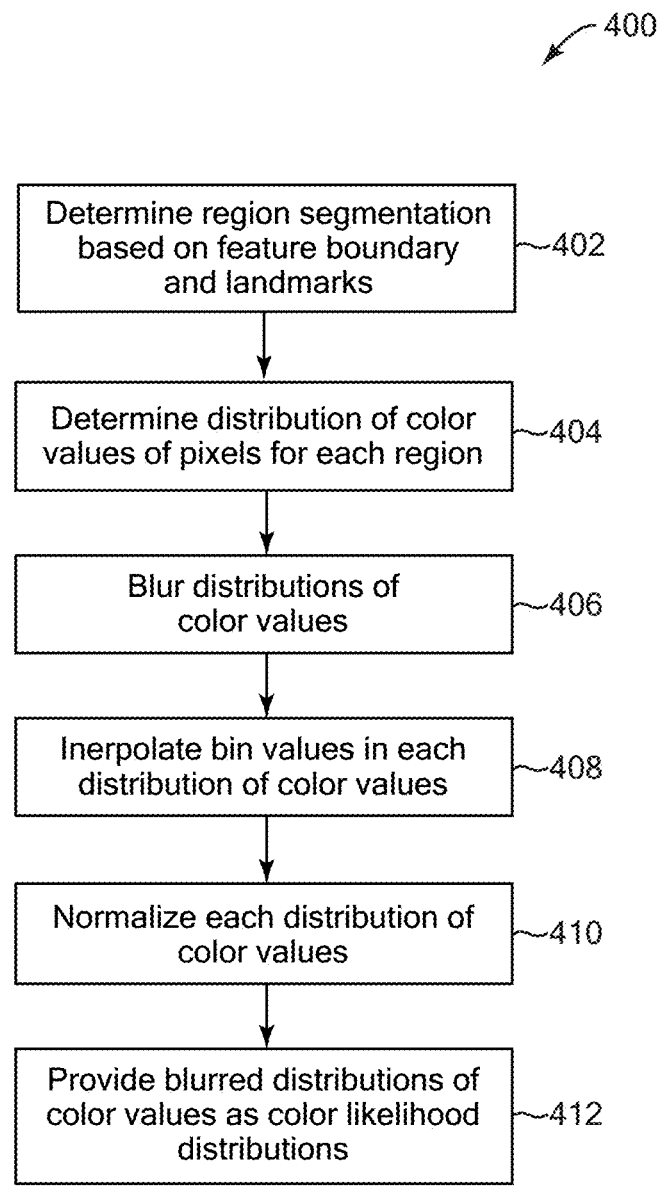
FIG. 4 is a flow diagram illustrating an example method to determine color likelihood distributions for regions determined in an image, according to some implementations.

FIG. 4 is a flow diagram illustrating an example method 400 to determine color likelihood distributions for regions determined in the image, e.g., for block 206 of FIG. 2. Other methods can alternatively be used for block 206. The processing of method 400 (and/or the other methods described herein) can be performed using any of a variety of different color spaces, e.g., HSV (hue-saturation-value), HSL (hue-saturation-lightness), RGB (red-green-blue), YCbCr, etc.

In block 402, a region segmentation is determined for the feature based on a feature boundary (e.g., determined in block 304 of FIG. 3) and/or based on one or more feature landmarks. The region segmentation can also or alternatively be based on other characteristics of the detected feature. The region segmentation can provide multiple regions of pixels in the image which can be designated as feature regions or non-feature regions, e.g., having naive labels of feature or non-feature. In some implementations, one or more of the regions can be designated as skin feature regions, e.g., pixels indicating skin color and included in a designated skin feature of the image. For example, a feature region can be determined which is assumed to contain feature pixels for purposes of determining the feature mask as described below. In some examples, to provide a greater likelihood that a segmented feature region mostly includes actual feature color values, the feature region can be defined in an area of the image based on the feature boundary and/or feature landmarks. In one example, if the feature is facial skin of a face and the landmarks are facial landmarks, a facial skin region can be defined in the image as an area inside a face boundary and between the eyes and chin landmark points of the face. For example, the skin region can be defined as having a border approximately follow a chin area "below" the mouth landmark. In some implementations, additional feature regions can be segmented, e.g., based on feature detection and/or landmarks known to be positioned relative to depicted portions of the feature (e.g., skin) In some implementations, other types of skin features, or portions thereof, can be segmented from other portions of the image into one or more regions. For example, body detection techniques may have determined positions of hands of a person in an image, and a portion of such a detected hand can be segmented as a skin region.

One or more non-feature regions can also be segmented, which can be assumed to have non-feature pixels. For example, one or more non-feature regions can be defined as background regions outside a feature boundary. In one example of a facial skin feature, a non-feature region can be defined outside an ellipse boundary of a face. In some implementations, additional non-feature regions can be seg- mented. In one example for a facial skin feature of a face, facial landmark regions can be defined which cover areas of the image that depict facial landmarks. For example, an approximate area indicated by eye landmark points can be segmented as a non-feature region, for each eye. Similarly, other non-feature regions can be segmented to approximately cover detected landmarks including eyebrows and a mouth of the face. Some implementations can detect and segment other types of non-feature regions, including hair (e.g., hair, mustache, beard, etc.), glasses on the face, etc.

Some implementations can use other foreground and background segmentation techniques to determine background non-feature regions in the image and/or determine foreground pixels (e.g., face and body pixels) that can be used to determine feature region segmentation. For example, some techniques can use depth information that is associated with the image, where the depth information indicates a distance of each pixel in the image from a depth-enabled camera that captured the image. Such information can be used to determine background pixels, e.g., pixels that are a further distance from the camera. Other techniques can also be used to determine foreground and background pixels. For example, if the image is a frame in a video sequence of multiple image frames, then multiple frames can be examined to estimate foreground regions (e.g., that may move between frames) and background regions (e.g., that may stay static) in the image.

In block 404, distributions of color values of pixels are determined in each of the regions segmented in block 402 (or in each of a subset of the segmented regions). For example, one or more of the distributions of color values can be implemented as histograms in some implementations. In some implementations, a distribution of color values for a particular region can include counts of the number of pixels in that region which have each particular color value found in that region, or have a color value in each defined color value range. For example, in some implementations, each count can be the number of pixels having a color value in an associated bin of a histogram representing a particular range of colors, with a number of bins defined. In one example, the histogram can have a bin for each 10 color values, such that color values 0-9 are in bin 1, color values 10-19 are in bin 2, etc., up to a maximum color value, e.g., 255. A count of the number of pixels having a color value in the range of 0 to 9 is determined for bin 1, a count of the number of pixels having a color value in the range of 10-19 is determined for bin 2, etc. Such a histogram can be determined for the associated region for each color channel of the used color space, e.g., for a red channel, green channel, and blue channel if using the RGB color space, thereby providing a three-dimensional (3D) histogram. Other color spaces can alternatively be used. Various implementations can provide different bin sizes or can determine distributions in other ways.

Thus, the distribution of color values for a segmented feature region can indicate the number of pixels having each range of color values. The distribution can indicate which ranges of color values are most common in the region. Similarly, a distribution of color values can be determined for each of one or more of the non-feature regions segmented in block 402.

In block 406, one or more of the distributions of color values is blurred. For example, each distribution for each region can be blurred independently. In some implementations, each distribution of color values is a histogram and the blurring includes blurring the histogram. For example, convolution can be performed between the histogram function (e.g., the number of counts in the associated region at each possible color value or bin) and a kernel function to obtain the blurred histogram. In some examples, the kernel function can be a Gaussian function that can cause a spreading and/or flattening of the histogram function. This can allow color value counts to be spread across a greater range of color values in the distribution, e.g., allowing each region to be represented by a greater range of color values in the distribution of color values as compared to the distribution before the blurring. For example, compared to the unblurred distributions, the blurring can provide a better indication of probability or confidence for color values that may not be present in the associated region but which are close in value to color values present in the associated region. In addition, blurred histograms (e.g., 3D histograms) are efficient representations of color distributions.

Figure 5A:
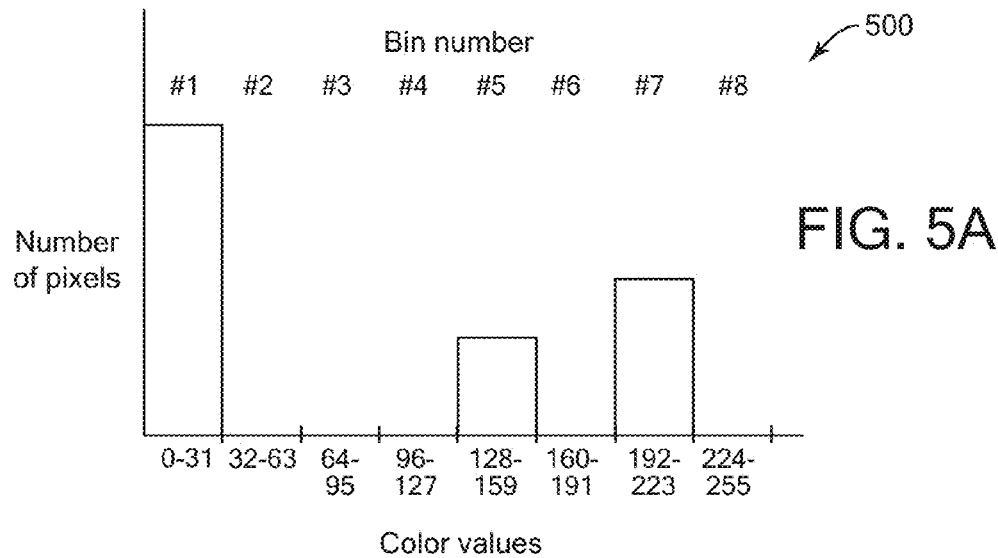
FIGS. 5A, 5B, and 5C are diagrammatic illustrations of an example of blurring and interpolating a color value histogram.
Figure 5B:
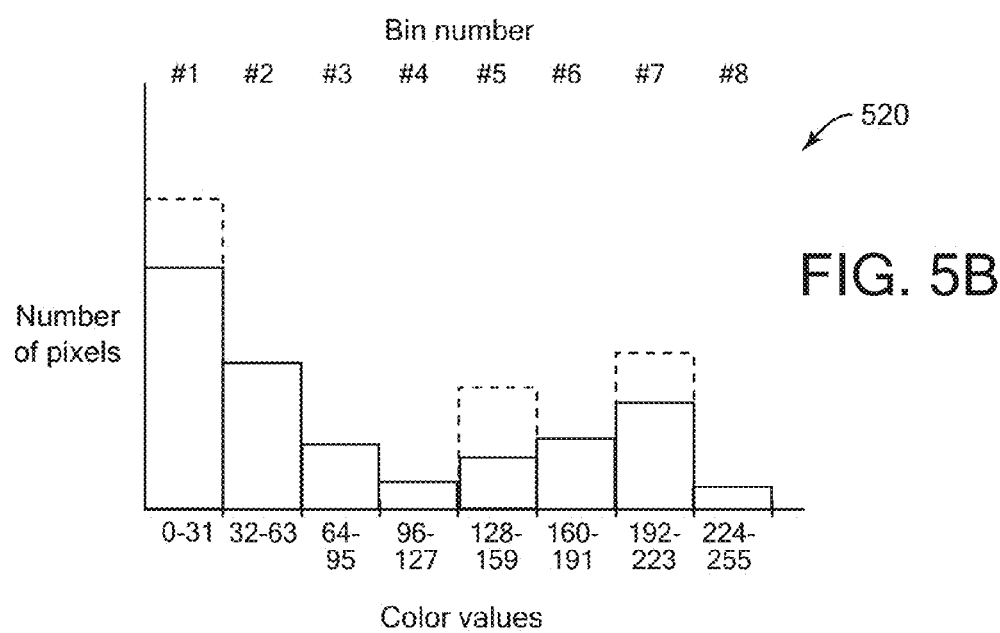

Referring to FIGS. 5A and 5B, an example of blurring a color value histogram is shown. In FIG. 5A, a one-dimensional histogram 500 indicates a number of pixels in a particular segmented region (e.g., a facial skin region) of the image for different ranges of the entire range of color values in a particular color channel. Each range of color values is grouped as a bin, such as Bin 1, Bin 2, etc. In this example, a large count of pixels has been found for Bin 1, a smaller count of pixels has been found for Bin 5, a different count of pixels has been found for Bin 7, and no pixels have been found for the other bins of color values. In this example, Bin 2 is adjacent to Bin 1 and thus closer in value to Bin 1 than non-adjacent Bins 3-8. In one example, a pixel of the input image having a color value that is in Bin 2 but close in value to Bin 1 can be assigned a probability of zero, even though it may have a color value that is or is close to a feature color (e.g., a skin color).

In FIG. 5B, a blurred histogram 520 is an example simplified result of blurring the histogram 500 of FIG. 5A, e.g., using one or more Gaussian kernel functions. In some implementations, the same Gaussian function can be used for all the histogram bins. Some implementations can use different functions, e.g., a different Gaussian function for each bin or each of multiple bins in the histogram.

Histogram 520 has been blurred to cause Bins 2, 3, and other formerly zero-count bins to have a higher count of pixels and, e.g., Bin 1 to have a lower count. This blurring can allow, for example, skin-colored pixels having a color value in Bin 2 close to the color values of Bin 1 to be assigned a higher probability or confidence (e.g., higher count value) for being a pixel type associated with the region of the histogram (e.g., a skin pixel). An unblurred histogram, in contrast, may cause a probability of being a skin pixel to be determined as zero for pixels having color values in Bin 2. Similarly, Bins 3, 4, 6 and 8 have non-zero count values in the blurred histogram 520, and Bins 5 and 7 have slightly lowered count values. The count values have thus been spread into other color value ranges to provide a more averaged probability for any particular color value in the range.

Referring back to FIG. 4, in various implementations, one or more various types of blur operations can be performed on the distributions of color values in block 408. In some examples, a blur operation can provide an independent blur along each color channel of a histogram separately. For example, the blur operation can use a 3D Gaussian kernel with an identity correlation matrix. In some examples using a 3D histogram, this blur operation can include a blur operation in a first dimension for one color channel, a blur operation in a second dimension that is orthogonal to the first dimension for a second color channel, and a blur operation in a third dimension that is orthogonal to the first and second dimensions for a third color channel.

In another example of a different type of blur operation, the blur operation can be a correlated blur along an axis for which the color values of the different color channels are approximately equal. For example, the blurring can include blurring values of the distributions along an axis for which red channel values, green channel values, and blue channel values of the colors are approximately equal. In some examples, in a 3D histogram in the RGB color space, the correlated blur can be performed along an R=G=B axis. This can allow counts to be spread in other bins of the histogram that represent color values having lighting changes, e.g., darker or lighter color values but representing the same depicted feature. For example, if a represented feature gets brighter in an image, e.g., based on increased lighting in an area of the image, all color channels typically move together by approximately the same amount.

In some implementations, multiple types of blur operations can be performed on a distribution of color values. For example, an independent blur can be performed on a histogram along each color channel, and then a correlated blur operation along an axis as described above can be performed on the blurred histogram. In another example, the correlated blur operation can be performed on the histogram, followed by the independent blurs along each color channel.

Figure 5C:
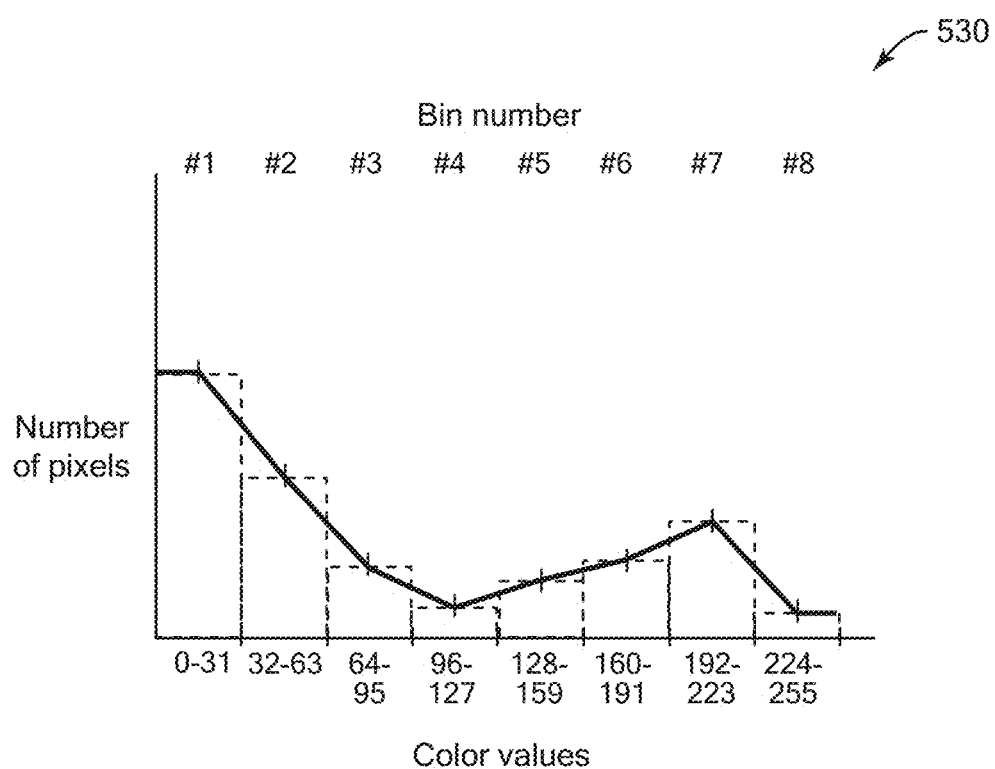

In block 408, the bin values in each blurred distribution of color values may be interpolated in some implementations to provide a more continuous probability function than a histogram that has a constant value for each bin. For example, interpolated values may be estimated between adjacent bin values, e.g., between the mid-points of color value ranges of adjacent bins in a distribution of color values. In some examples, the method can linearly (or tri-linearly in 3D) interpolate between the midpoints of the bins. FIG. 5C shows one example of a probability function 530 that is a linear interpolation between the mid-points of the bins of the histogram of FIG. 5B to provide a more continuous range probability values for various color values.

In block 410, the distributions of color values can be normalized. For example, the counts of the color values can be normalized such that all the counts in the distribution add up to a particular total value, e.g., a value of 1. This can allow the normalized counts of color values to indicate a probability or confidence of those color values occurring in the associated segmented region of the image, based on the distribution of those color values in the region. In some implementations, normalization can be performed before the blurring of block 406.

In block 412, the blurred distributions of color values are provided as color likelihood distributions. For example, the normalization of block 410 can cause the count values in a histogram to sum to a normalized total, such as 1. This can allow each normalized count value to be used as a probability indicating a likelihood that the corresponding pixel of the image is the type of pixel indicated by that distribution (e.g., feature pixel or non-feature pixel), if the corresponding pixel has a color value falling in the bin associated with that count value.

In some implementations, multiple distributions of similar types for different segmented regions of the image can be combined, e.g., before or after the normalization, interpolation, and/or blurring of blocks 406, 408, and/or 410. In one example, a distribution of color values for a background region is for a non-feature region, and distributions of color values for eye regions of a facial skin feature are also for non-feature regions. The distribution of color values for the background region can be combined with the distributions of color values for the eye regions. For example, the color values of the eye histogram can be added to a histogram for the background region, and the combined histogram can be normalized and blurred in blocks 406, 408, and 410. In some implementations, processing can be provided in a different order, e.g., blurring of a combined histogram can be performed after color values from different regions are combined in the combined histogram. Similarly, distributions of color values for eyebrow regions and a mouth region of a detected face are for non-feature regions and these distributions can be combined with the distributions for the background region and/or the eye regions to provide a combined distribution of color values for all of these segmented non-feature regions. In some implementations, if multiple feature regions are segmented in the image, the distributions of color values for the multiple feature regions can be combined similarly as described for the non-feature regions to provide a color likelihood distribution associated with the multiple feature regions.

In some implementations, each of one or more of the color likelihood distributions, or combinations thereof, can be determined in block 412 as a likelihood mask indicating a likelihood distribution over the image on a pixel basis. For example, each mask pixel of a likelihood mask can correspond to a pixel of the image, where a mask pixel of the likelihood mask can indicate the probability of that pixel being of the type associated with the mask. For example, the mask pixel can indicate the probability of the corresponding image pixel being a feature pixel (e.g., facial skin pixel) if the mask is a feature likelihood mask derived from a distribution of feature color values (e.g., facial skin color values). Similarly, in a mask that is a non-feature likelihood mask derived from a distribution of non-feature color values, each mask pixel can indicate the probability of the corresponding image pixel being a non-feature pixel. In some implementations, multiple types of likelihood masks can be determined in block 412, e.g., feature mask and non-feature mask. In another example, the likelihood masks can include a facial skin mask, background non-feature mask, eye non-feature mask, eyebrow non-feature mask, and mouth non-feature mask (and/or other likelihood masks for other segmented regions of the image).

A likelihood mask can be determined based on the associated distribution of color values. For example, for each mask pixel position of a likelihood mask, a corresponding image pixel of the image can be examined for its color value. This color value can be looked up in the appropriate color value bin in the associated distribution of color values for the mask to obtain a resulting probability value that is the value of the bin. In some implementations using interpolated distributions of color values as described for block 408, a color value can be looked up in an interpolated distribution to find a linearly interpolated probability value.

For example, if the likelihood mask is a facial skin likelihood mask, the color value is looked up in the distribution of color values for the facial skin region, or if the likelihood mask is a non-feature likelihood mask, the color value is looked up in the appropriate distribution values for the non-feature region(s) (e.g., the background region, and/or a non-skin facial landmark region). The lookup in the distribution of color values obtains a probability value for that color value based on the count of color values for that color value bin (or based on a value interpolated between bins) and based on any processing including normalizing and/or blurring of the distribution. The obtained probability value can be provided in the likelihood mask, e.g., visualized as a shade between black and white in examples described below. Each mask pixel of the likelihood mask can be similarly determined. For example, in some implementations the mask pixels can be determined partially or completely in parallel, e.g., one mask pixel determined while one or more other mask pixels are being determined, to allow fast processing. Some implementations can determine the mask pixels partially or completely sequentially.

In some implementations, there may be less information as to how to segment the regions in block 402, e.g., having no detected features from the image, no spatial function or boundary for a feature, etc. In some such implementations, regions can be segmented based on general image characteristics, such as edges, textures, similar colors, or other characteristics found in the image, and the distributions of color values can be estimated based on such regions. In some such implementations, the method can alternate between segmentation of regions and estimation of color value distributions for regions. For example, initial regions can be determined in an image, e.g., with random guesses to the segmentation of the initial regions. Color distributions can be estimated for each region in the segmentation. The image can be segmented based on the estimated color distributions. The estimation of color distributions and following segmentation of the image can then be repeated until convergence, until a particular point in time, or until some other condition.

Figure 6:
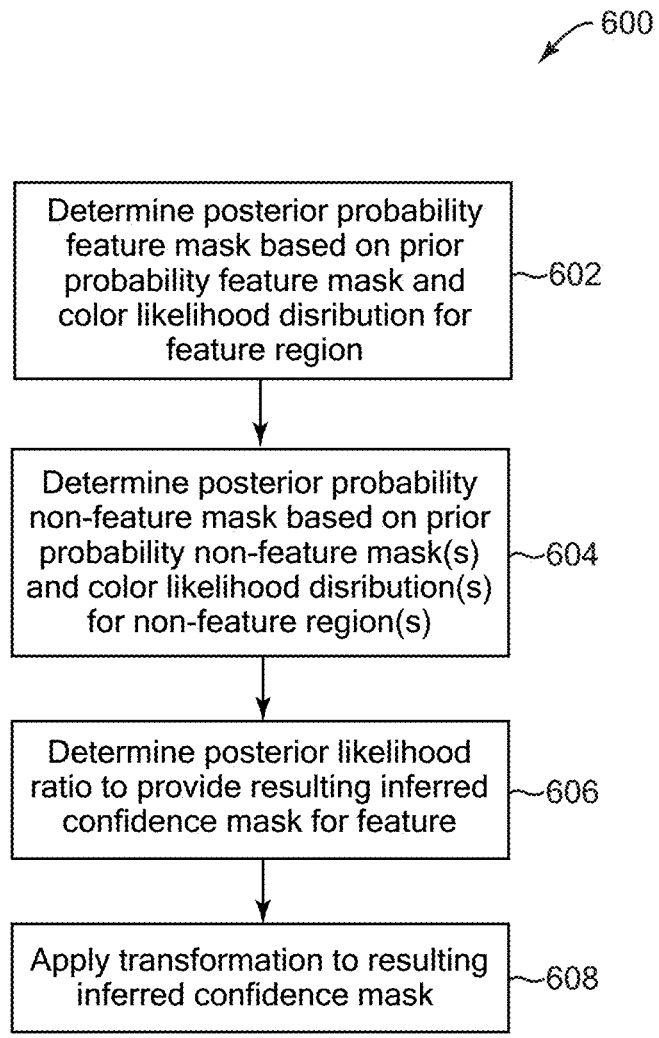
FIG. 6 is a flow diagram illustrating an example method to determine a confidence mask for an image feature, according to some implementations.

FIG. 6 is a flow diagram illustrating an example method 600 to determine a confidence mask for the feature based on the spatial function and one or more of the color likelihood distributions, e.g., for block 208 of FIG. 2. Other methods can alternatively be used for block 208.

In block 602, a posterior probability feature mask is determined. The posterior probability feature mask can be determined based on the prior probability feature mask of block 306 and the color likelihood distribution(s) for the feature region(s) of the image as determined in block 410. For example, the prior probability feature mask can be multiplied by the color likelihood distribution for the feature region to obtain the posterior probability feature mask. The posterior probability feature mask indicates the probability at each of its pixels that the corresponding pixel of the image is included in the representation of the detected feature in the image, e.g., a skin feature such as facial skin. The posterior probability feature mask can include mask pixels corresponding to all the pixels of the image, or to a portion of the pixels of the image, e.g., for one or more areas of the image less than the entire area of the image.

In block 604, a posterior probability non-feature mask is determined. The posterior probability non-feature mask can be determined based on a prior probability non-feature mask of block 310 and at least one color likelihood distribution for the non-feature region(s) of the image as determined in block 410. For example, a prior probability non-feature mask for a particular non-skin region can be multiplied by the corresponding color likelihood distribution for that non-skin region to obtain the posterior probability non-feature mask for that region.

In some example implementations, the posterior probability non-feature mask can be based on a background non-facial-skin region, e.g., a region in the image outside a skin boundary of a facial skin feature region. In some implementations, the posterior probability non-feature mask can be based on multiple non-feature regions, e.g., the background region and/or other non-facial-skin regions, e.g., eye regions, eyebrow regions, and mouth region. In some implementations, multiple regions can each have a posterior non-feature mask determined, and the multiple posterior non-feature masks for the various non-feature regions can be combined into a combined posterior non-feature mask.

The posterior probability non-feature mask indicates the probability at each of its pixels that the corresponding pixel of the image is not included in a representation of the detected feature in the image. The posterior probability non-feature mask can include mask pixels corresponding to all the pixels of the image, or corresponding to a portion of the pixels of the image, e.g., for one or more areas of the image less than the entire area of the image.

In block 606, a posterior likelihood ratio is determined to provide a resulting inferred confidence mask for the detected feature. For example, the posterior likelihood ratio can be determined as the ratio of the posterior probability feature mask of block 602 to the posterior probability non-feature mask of block 604 to determine the resulting inferred confidence mask. For example, each inferred confidence mask pixel value can be the result of this ratio of the corresponding mask pixel values of the posterior probability feature mask to the posterior probability non-feature mask. In some implementations, the log of the posterior likelihood ratio can be determined in block 606. Thus, the inferred confidence mask values can be inferred based on the results of the posterior likelihood ratio.

In some examples, the ratio can increase the skin definition in a resulting facial skin mask, since both the probability that a pixel is facial skin and the probability that the pixel is not facial skin are used in the inferred confidence mask. For example, if the result of the ratio is greater than 1 at a particular mask pixel, then the probability of the corresponding pixel of the image being a facial skin pixel is greater than the probability of that pixel being a non-facial-skin pixel. Similarly, if the result of the ratio is less than 1 at the mask pixel, then the probability of the corresponding pixel of the image being a non-facial-skin pixel is greater than the probability of that pixel being a facial skin pixel. The magnitude of the result of the ratio can indicate a confidence that the corresponding pixel is a facial skin pixel or non-facial-skin pixel. For example, if the probability of a facial skin pixel is relatively low, e.g., 0.1, and the probability of a non-facial-skin pixel is relatively high, e.g., 0.9, then the ratio is low and the resulting mask can be provided with a pixel value indicating a low probability of a facial skin pixel. If the probability of a facial skin pixel is approximately the same as the probability of a non-facial-skin pixel, then the ratio is close to 1 and the resulting mask can be provided with a pixel value indicating a middle probability of a facial skin pixel, indicating an amount of uncertainty as to the feature status of the pixel. Similarly to the posterior feature and non-feature masks, the resulting inferred confidence mask can include mask pixels for all the pixels of the image, or for a portion of the pixels of the image, e.g., for one or more areas of the image less than the entire area of the image.

In block 608, a transformation can be applied to the inferred confidence mask to scale the values of the inferred confidence mask to a desired range of values. For example, a linear transformation can be applied, e.g., experimentally-determined parameters can be multiplied and/or an offset added to the mask pixel values. In some implementations, the range of values in the resulting probability mask can be clamped to a desired range. For example, the method can perform a linear transformation on the log of the posterior likelihood ratio resulting from block 606. In one example, the output confidence mask can be provided as m*log(X/Y)+b, where X and Y are the feature and non-feature posterior probability masks, respectively, and m and b are learned constants. The confidence mask value can then enforced to be in a particular range of color values. For example, the mask value can be enforced to be between 0 and 255 in some implementations, or other ranges in other implementations.

Various blocks and operations of methods 200-400 and/or 600 can be performed in a different order than shown and/or at least partially simultaneously, where appropriate. For example, some implementations can perform blocks of the methods at various times and/or based on events not related to providing an image for display. In some implementations, blocks can occur multiple times, in a different order, and/or at different times or stages in the methods.

In some implementations, the methods 200-400 and/or 600 can be implemented, for example, on a server system (e.g., server system 102 shown in FIG. 1). In some implementations, one or more client devices (e.g., client devices shown in FIG. 1) can perform one or more blocks instead of or in addition to a server system performing those blocks. For example, images can be stored on a client device and one or more distributions and/or masks can be determined and/or stored on a server device, or vice versa.

FIGS. 7-18 are diagrammatic illustrations related to examples of determining a feature mask for an intended feature of facial skin depicted in an image, using one or more features described herein. These figures show line drawings of faces that represent images having pixels, e.g., digital photographs originally captured by a camera or similar types of images. In some implementations, the images shown in FIGS. 7-18 can be displayed in a user interface that in turn can be displayed on a display device, e.g., of a client device 120, 122, 124, and/or 126 of FIG. 1, or a server system 102 in some implementations. In some implementations, images can be processed as described herein and displayed in other types of user interfaces, one or more screens of an application program, or other visual output of a display device. In other implementations, images can be processed as described herein without being displayed, or can be displayed in other ways.

Figure 7:
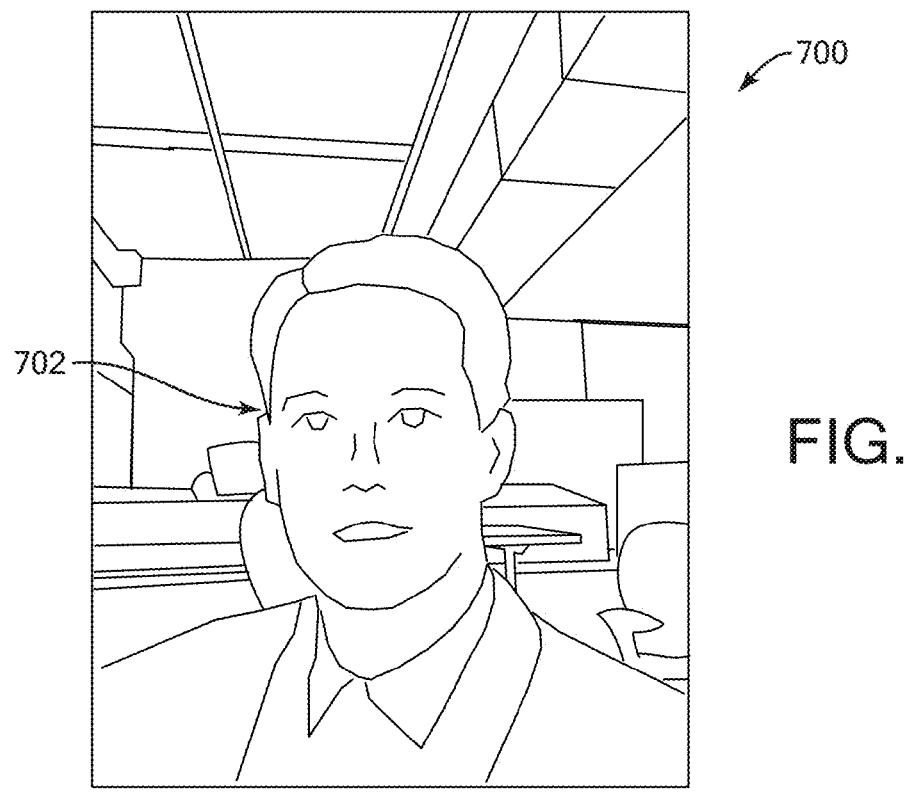
FIG. 7 is a diagrammatic illustration of an example input image.

FIG. 7 shows an example image 700 which can be obtained for processing as described above. Image 700 can be an image captured by a camera, in some implementations. The image depicts a face 702 including facial skin as a skin feature desired to be masked.

Figure 8:
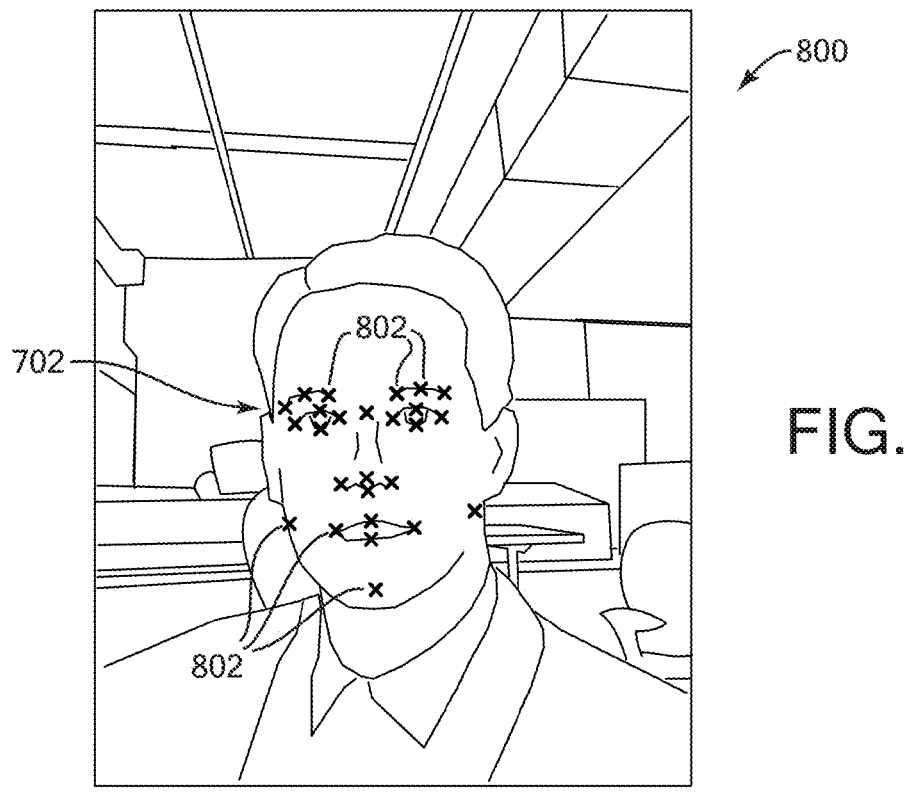
FIG. 8 is a diagrammatic illustration of an example image showing facial landmark points detected in the example image of FIG. 7.

FIG. 8 shows an example image 800 after the face 702 (including facial skin) has been detected in the image 700 using one or more facial recognition techniques as described above. For example, one or more facial recognition techniques can be used to detect the face by detecting facial landmarks in an image, including eyes, eyebrows, nose, mouth, etc. In this example, facial landmark points 802 have been determined by a facial recognition technique, as indicated by X symbols in FIG. 8, where points 802 are positioned within, or at edges of, facial landmarks including eyes, eyebrows, center of nose between eyes, tip of nose, left and right sides of nostrils, center of bottom of nose, sides of face at cheeks, and chin. Other facial landmark points can be determined using other facial recognition techniques or implementations.

Figure 9:
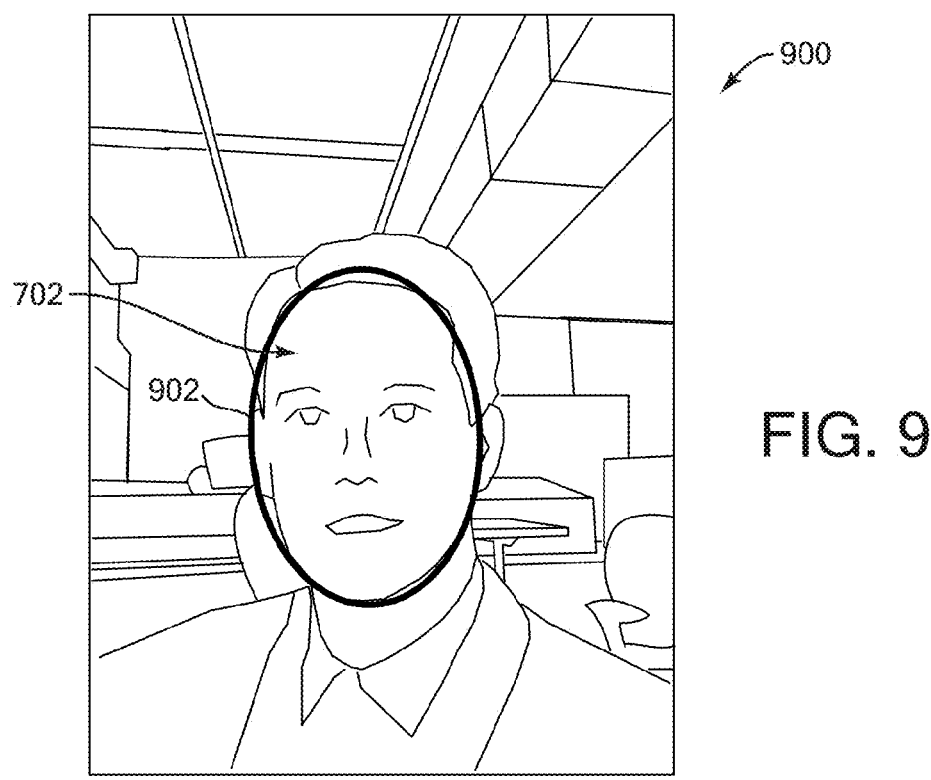
FIG. 9 is a diagrammatic illustration of the example image after a feature boundary has been determined.

FIG. 9 shows an example image 900 after a skin feature boundary has been determined for the image 700. In this example, the skin feature boundary is a facial boundary that is an ellipse 902. Ellipse 902 has been positioned on the face 702 based on the facial landmark points 802 determined based on the facial landmarks of the face. For example, in some implementations, the ellipse 902 can be determined based on the spacing of the facial landmark points 802 of the face 702, e.g., where a predetermined average distance above eyes, below mouth or chin, to the left and right of eyes, etc., where the averages distances can be based on sample faces. In some implementations, a machine learning technique can be used, e.g., where a large variety of multiple training images having manually-drawn ellipses can be provided to the machine learning technique. The machine learning technique can find and track distances between landmarks and the manual ellipses so that the technique determines how to position a new ellipse 902 on a face in new image based on the facial landmarks of the face.

Figure 10:
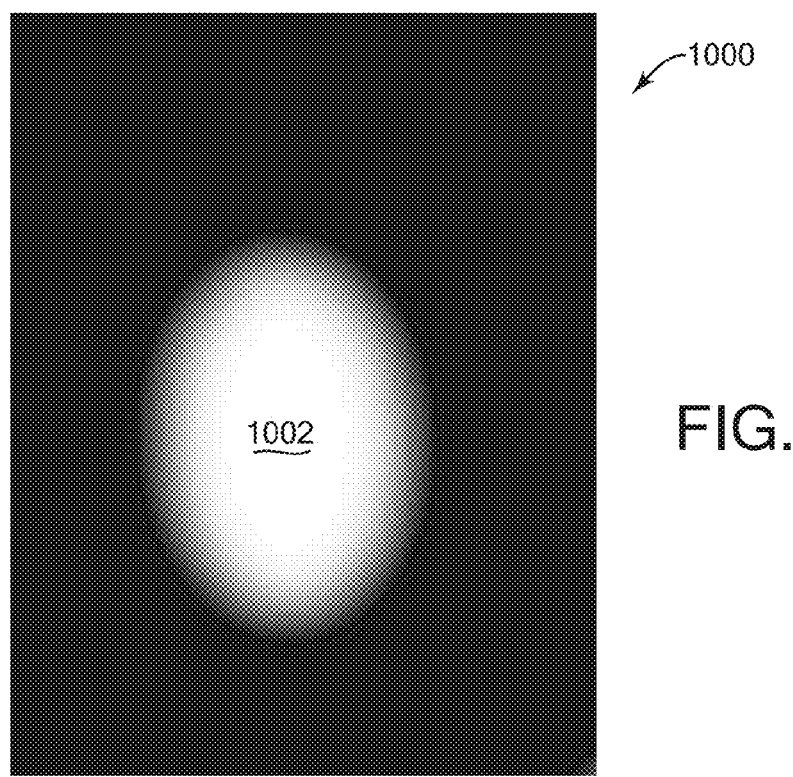
FIG. 10 is a diagrammatic illustration of an example prior probability feature mask determined based on the image and feature boundary of FIG. 9.

FIG. 10 shows an example prior probability feature mask 1000 determined based on the image 900 having boundary ellipse 902. Prior probability feature mask 1000 provides an ellipse-shaped area 1002 at a location corresponding to the ellipse 902 in image 900. The image area within the ellipse 902 of FIG. 9 are considered to be feature pixels (facial skin pixels) and areas outside the ellipse 902 are considered to be non-feature pixels (non-facial skin pixels). Mask 1000 is an initial approximate estimate of probabilities of feature pixels for the image 700, and is based on the spatial boundary established by the ellipse 902.

In this example, the prior probability mask 1000 shows a white color at pixels of the mask which indicate a 100% (estimated) probability that the corresponding pixel of the image is a skin pixel (in this case, a facial skin pixel). Similarly, the prior probability mask 1000 shows a black color at pixels of the mask which indicate a 0% (estimated) probability that the corresponding pixel of the image is a facial skin pixel. In this example, the ellipse-shaped area 1002 of the mask has been blurred such that the borders of the area 1002 are grey, indicating a gradient or gradual change in probabilities from the inside of the area 1002 to the mask region external to the area 1002.

Figure 11:
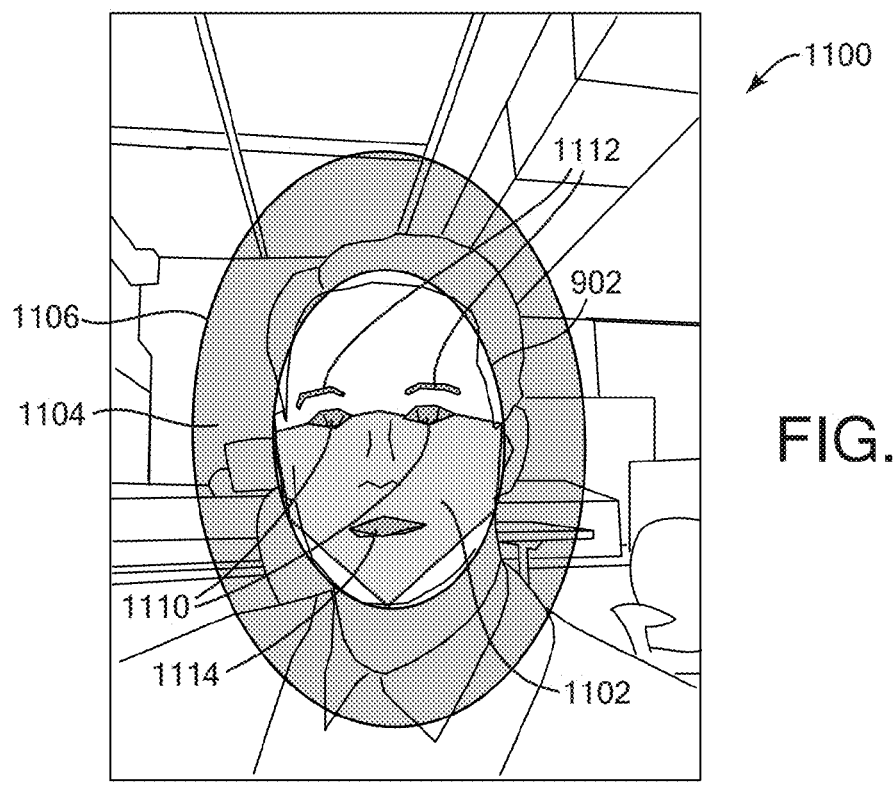
FIG. 11 is a diagrammatic illustration of a number of regions segmented in the example image for determining color value distributions.

FIG. 11 shows an example image 1100 in which a number of regions segmented in image 700 for determining color value distributions, e.g., as described in block 402 of FIG. 4. The regions can be determined, for example, based on the determined spatial boundary of a skin feature, such as ellipse 902 of FIG. 9, and/or based on landmarks determined for the skin feature, such as facial landmark points 802 of FIG. 8.

In this example, a facial region 1102 has been segmented as a skin region to determine a distribution of color values for facial skin. For example, facial region 1102 can be determined based on facial landmark points 802 and/or based on the ellipse 902. In one example, the facial region 1102 can be determined by drawing segments between eye points and a mid-point of a nose, segments between the left and right extremes of the eyes and the side of the ellipse 902, segments along the sides of the ellipse 902, segments to a chin landmark point, etc. In some implementations, additional or alternative skin regions to determine distributions of skin color values can be determined, e.g., in different portions of the face within ellipse 902, using other skin features depicted in the image (hands, arms, legs, feet, etc.), etc.

One or more non-feature regions are also segmented. For example, a non-feature background region 1104 can be segmented in some implementations. In this example, background region 1104 extends outward from the boundary of the facial boundary ellipse 902 to include one or more areas of the image outside the ellipse 902. For example, the non-feature background region 1104 can extend to a predetermined or arbitrary outer ellipse boundary 1106 or form a different shape to limit the number of color values determined for the color value distribution for this region, or the region 1104 can extend to the borders of the image in some implementations.

In some implementations, additional or alternate non-feature regions can be segmented. In this example, various non-feature regions can be segmented within the facial boundary ellipse 902. For example, eye regions 1110 can be determined based on multiple landmark points 802 defining detected eyes of the face. Eyebrow regions 1112 can be determined based on landmark points 802 defining eyebrows of the face. A mouth region 1114 can be determined based on landmark points 802 defining a mouth of the face. Other non-feature regions can be determined in some implementations, e.g., portions of hair, glasses, facial hair, etc.

Figure 12:
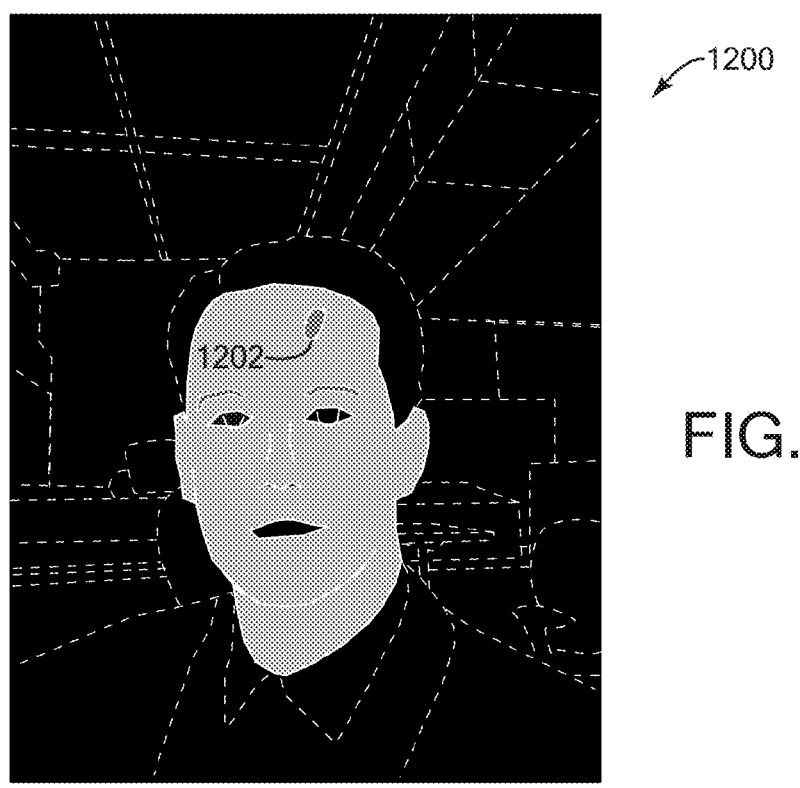
FIG. 12 is a diagrammatic illustration of an example likelihood feature mask determined based on color value distributions in a segmented region of FIG. 11.

FIG. 12 shows an example feature likelihood mask 1200 determined based on the color value distributions in one or more segmented regions described above for FIG. 11. For example, feature likelihood mask 1200 can be based on the distribution of color values in the facial skin region 1102. Similarly as described above with reference to the example of FIG. 4, a distribution of skin color values can be determined in the facial skin region 1102, and this distribution can be blurred, interpolated, and/or normalized. A color likelihood distribution can be determined from the processed distribution of color values, where the feature likelihood mask 1200 provides a color likelihood distribution on a mask pixel basis corresponding to pixels of the image.

The example feature likelihood mask 1200 includes lighter colored pixels for pixels of the image that were found to have high probability of being facial skin as based on the distribution of color values for the facial skin region 1102. Feature likelihood mask 1200 also includes dark colored pixels for pixels of the image that were found to have low probability of being facial skin. For example, hair regions around the face, background regions of the image outside the face, eye regions, eyebrow regions, and a mouth region are darker in shade to indicate the lower probability of being facial skin. Dashed white lines are shown in the example mask 1200 of FIG. 12 simply for reference, to indicate positions of the torso and background areas of the corresponding image. These dashed lines are not present in the actual likelihood mask 1200.

Some other areas of the feature likelihood mask 1200 can also be assigned darker-shaded pixels, such as in a forehead reflection area 1202. In this example, area 1202 represents a specular highlight on the forehead skin of the face, which (in the image 700) primarily shows a color of the light that is reflecting off the skin and not a skin color (e.g., not a color obtained from the diffuse properties of the skin) These types of highlights can be darker in mask 1200 since their pixels did not have color values similar to the higher probability color values in the facial skin region 1102.

Figure 13:
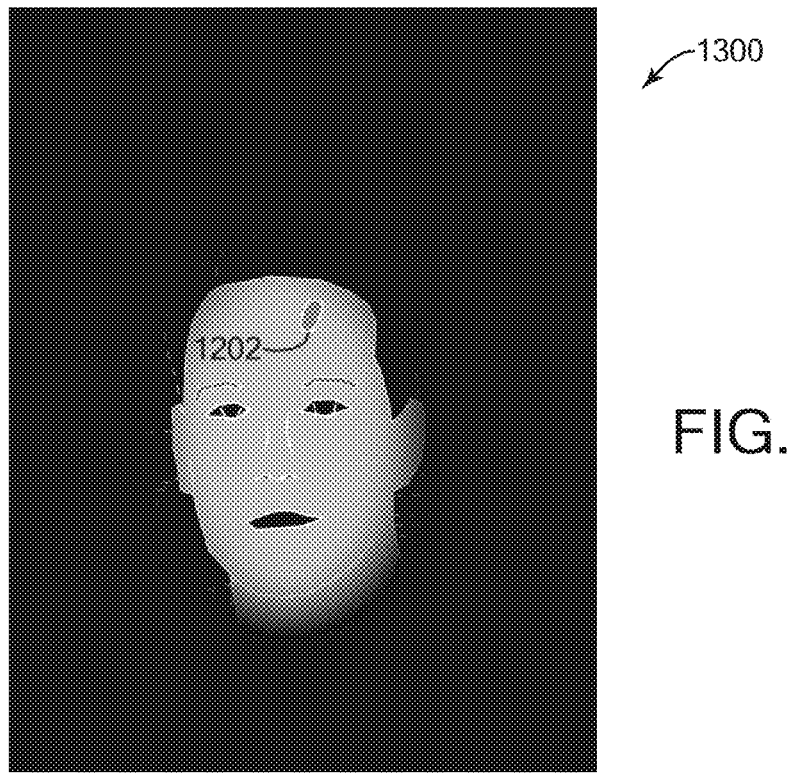
FIG. 13 is a diagrammatic illustration of an example posterior probability feature mask determined based on the prior probability feature mask and a color likelihood distribution of FIG. 12.

FIG. 13 shows an example of a posterior probability feature mask 1300 determined based on the prior probability feature mask 1000 of FIG. 10 and the color likelihood distribution (e.g., feature likelihood mask 1200) described above for FIG. 12. The posterior probability feature mask 1300 indicates the probability that pixels of the image are facial skin pixels, e.g., where higher probability is indicated in lighter shades of pixels and lower probability is indicated in darker shades of pixels. Other implementations can indicate probability or confidence with other shades or color values.

For example, posterior probability feature mask 1300 can be determined from a combination of the prior feature mask 1000 and the feature likelihood mask 1300. In some implementations, the prior feature mask 1000 is multiplied by the feature likelihood mask 1300 to obtain the posterior probability feature mask 1300. The result is that the blurred ellipse of the prior feature mask 1000 provides a spatial limit such that only pixels within the ellipse have a probability above zero of being a facial skin pixel, and the feature likelihood mask 1200 indicates facial skin pixels within the ellipse. The blurred edge of the ellipse of the prior feature mask 1000 provides a gradual falloff of facial skin pixels, e.g., shown as a fade from lighter shades to darker shades at the neck and ears around the face.

Figure 14:
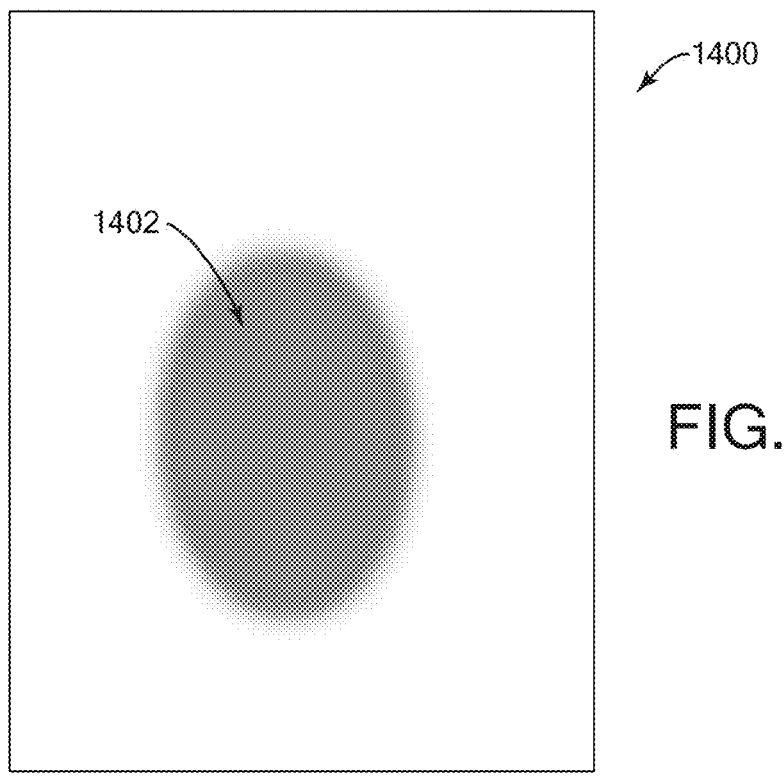
FIG. 14 is a diagrammatic illustration of an example prior probability non-feature mask determined based on the image and feature boundary of FIG. 9.

FIG. 14 shows an example prior probability non-feature mask 1400 determined based on the image 900 with boundary ellipse 902. Prior probability non-feature mask 1400 provides an ellipse-shaped area 1402 at a location corresponding to the ellipse 902 in image 900. Areas within the ellipse 902 of FIG. 9 are considered to be facial skin pixels and areas outside the ellipse 902 are considered to be non-feature pixels, e.g., pixels that do not have a facial skin color value. Mask 1400 can be an initial approximate estimate of probabilities of non-feature pixels for the image 700.

In this example, the prior probability non-feature mask 1400 shows a dark color at pixels of the mask inside the ellipse, which indicate a low (e.g., close to 0%) probability that the corresponding pixel of the image is a facial skin pixel. Similarly, the prior probability non-feature mask 1400 shows a lighter shade (e.g., close to white color) at pixels of the mask outside the ellipse which indicate a close to 100% probability that the corresponding pixel of the image is a non-skin, non-facial pixel. In this example, the ellipse-shaped area 1402 has been blurred such that a gradient or gradual change in probabilities is provided from the inside of the area 1402 to the mask region external to the area 1402.

Figure 15:
FIG. 15 is a diagrammatic illustration of an example likelihood non-feature mask determined based on color value distributions in one or more segmented regions of FIG. 11.

FIG. 15 shows an example non-feature likelihood mask 1500 determined based on the color value distributions in one or more segmented regions described above for FIG. 11. For example, non-feature likelihood mask 1500 can be based on the distribution of color values in the background region 1104. Similarly as described above for the feature likelihood mask 1200 of FIG. 12, a distribution of non-feature color values can be determined in the background region 1104, and this distribution can be blurred, interpolated, and/or normalized. A color likelihood distribution can be determined from the processed distribution of color values, where the non-feature likelihood mask 1500 provides a color likelihood distribution on a pixel basis corresponding to pixels of the image.

Non-feature likelihood mask 1500 includes lighter colored pixels for pixels of the image that were found to have high probability of being non-facial-skin (e.g., outside the ellipse 902) as based on the distribution of color values for the non-feature background region 1104. In this example, the pixels sampled in the background region 1104 have a majority of color values in the background area, and these pixels have the lightest shade (e.g., close to white color). The non-feature likelihood mask 1500 also includes middle-shaded colored pixels for pixels of the image that were found to have lower probability of being non-facial-skin. For example, the facial skin areas, facial landmarks, hair regions around the face, the neck area, and torso areas below the face of the image are middle-shaded to indicate a lower probability of being non-facial-skin based on the distribution of color values in the background region 1104. In one example, the color values of pixels of the background region just outside the head and torso may determine the majority of color values assumed to be non-feature background pixels, where the middle-shaded areas have pixel color values different than those background pixels and are therefore shown as lower probability to be non-feature pixels.

In some implementations in which other non-feature areas of the image are determined, such as some facial landmark areas (e.g., eyes, eyebrows, and/or mouth) in the regions described above for FIG. 11, one or more non-feature likelihood masks can be determined for those non-feature areas. For example, in some implementations, a non-feature likelihood mask can be determined for the eye regions 1110 of FIG. 11, in which the eye pixels of the image have the lightest shade (e.g., close to white color) and most other pixels of the mask are darker in shade. Similarly, a non-feature likelihood mask can be determined for the eyebrow regions 1112 of FIG. 11, in which the eyebrow pixels of the image have the lightest shade (e.g., close to white color) and most other pixels of the mask are darker in shade. A non-feature likelihood mask can be determined for the mouth region 1114 of FIG. 11, in which the mouth pixels of the image have the lightest shade (e.g., close to white color) and most other pixels of the mask are darker in shade. Two or more of the non-feature likelihood masks can be combined in some implementations. For example, a single non-feature likelihood mask can include lighter shaded areas for eyes, eyebrow, and mouth pixels. In some implementations, a single non-feature likelihood mask can include lighter shade areas for such facial landmark areas as well as the lighter shade background region shown in FIG. 15.

Figure 16:
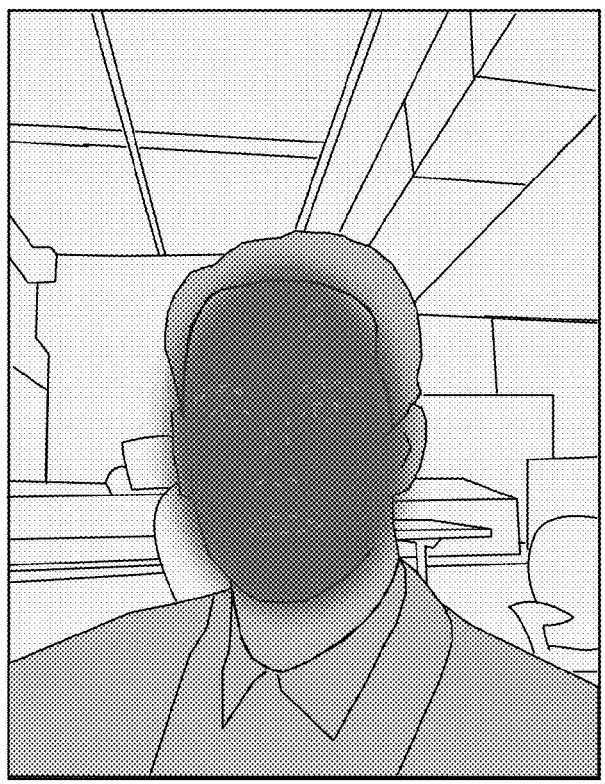
FIG. 16 is a diagrammatic illustration of an example of a posterior probability non-feature mask determined based on the prior probability non-feature mask of FIG. 14 and a color likelihood distribution of FIG. 15.

FIG. 16 shows an example of a posterior probability non-feature mask 1600 determined based on the prior probability non-feature mask 1400 of FIG. 14 and the color likelihood distribution (e.g., non-feature likelihood mask 1500) for a background region as described above for FIG. 15. The posterior probability non-feature mask 1600 indicates the probability that pixels of the image are non-feature pixels, e.g., not facial skin pixels, where higher probability is indicated in lighter shades of pixels and lower probability is indicated in darker shades of pixels. Other implementations can indicate probability with other shades or color values. Some facial features of the face are shown as dashed lines for reference, where the facial features are the same shade as the facial skin in this example since only the background region distribution of color values was used in determining the non-feature likelihood mask 1500 used to determine mask 1600.

For example, posterior probability non-feature mask 1600 can be determined from a combination of the prior non-feature mask 1400 and the non-feature likelihood mask 1500. In some implementations, the prior non-feature mask 1400 is multiplied by the non-feature likelihood mask 1500 to obtain the posterior probability non-feature mask 1600. The blurred ellipse of the prior non-feature mask 1400 provides a spatial limit such that only pixels within the ellipse have a low probability of being a non-facial-skin pixel, and the non-feature likelihood mask 1500 indicates probabilities of non-facial-skin pixels outside the ellipse.

The blurred edge of the ellipse of the prior non-feature mask 1400 can provide a gradual falloff from low-probability non-feature pixels to higher probability non-feature pixels, e.g., shown as a fade from darker shades to lighter shades from the center of the ellipse toward the neck and ears around the face.

Figure 17:
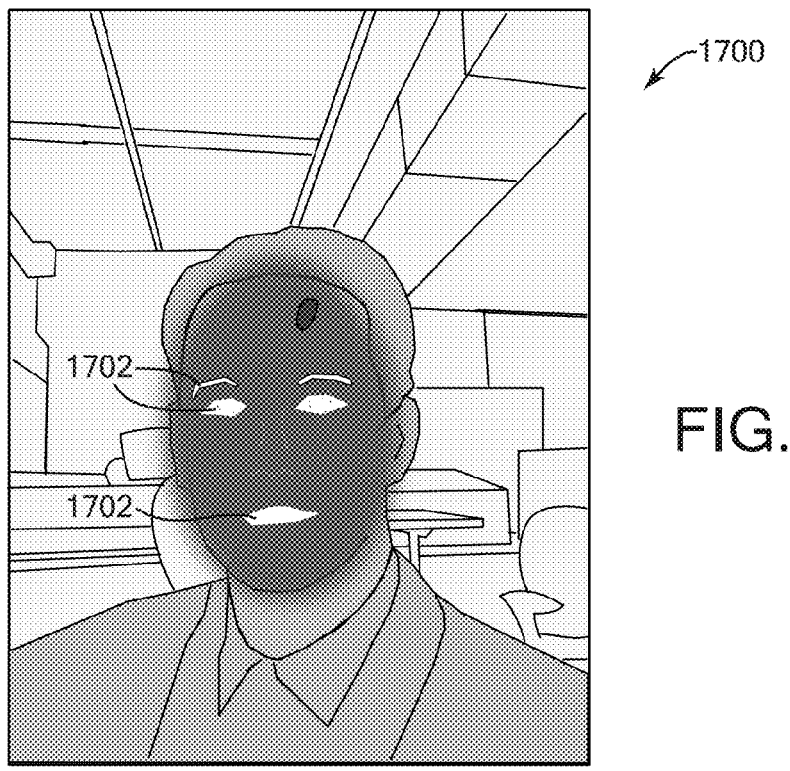
FIG. 17 is a diagrammatic illustration of another example of a posterior probability non-feature mask determined based on the posterior probability non-feature mask of FIG. 16 in combination with one or more color likelihood distributions for facial landmark regions.

FIG. 17 shows an example of another posterior probability non-feature mask 1700 which, in some implementations, can be determined based on the posterior probability non-feature mask 1600 in combination with one or more color likelihood distributions (e.g., non-feature likelihood mask(s)) for facial landmark regions. As with the posterior non-feature mask 1600 of FIG. 16, the posterior probability non-feature mask 1700 indicates the probability that pixels of the image are non-feature pixels, e.g., pixels not having facial skin color values, where higher probability is indicated in lighter shades of pixels and lower probability is indicated in darker shades of pixels. Other implementations can indicate probability with other shades or color values.

The posterior probability non-feature mask 1700 includes lighter shaded (e.g., close to white colored) mask areas 1702 for facial landmarks that were determined to include non-feature pixels based on the non-feature distributions of color values (and/or non-feature likelihood masks) determined for eye regions 1110, eyebrow regions 1112, and mouth region 1114. In some implementations, the landmark mask areas 1702 can be determined in the same mask image as the mask areas of mask 1600 determined from the distributions of color values for background regions of the image. For example, the values of pixels in the mask 1700 can be determined based on looking up color values of the corresponding image pixels in all the non-feature distributions of color values, including a background distribution and facial landmark distributions, e.g., where the highest probability of the distributions can be selected for each color value. Some implementations can combine multiple non-feature color distributions into a combined non-feature color distribution that is used to determine a combined non-feature likelihood mask, that is used in turn to determine the posterior probability non-feature mask. In some implementations, the facial landmark non-feature probability areas 1702 can be determined in one or more separate image masks and combined with a posterior non-feature mask (e.g., mask 1600) to provide the posterior non-feature mask 1700. For example, the facial landmark mask areas 1702 can be added to the posterior non-feature mask 1600 by superimposing or writing over the corresponding areas of the mask 1600 with the facial landmark mask areas 1702. In some implementations, one or more of the facial landmark mask areas can be omitted from posterior non-feature mask 1700.

Some implementations can increase the values indicating the non-feature (non-skin) status of facial landmark areas 1702 based on the geometry of the detected positions of facial landmarks, e.g., facial landmark points 802 of FIG. 8. For example, the values can be increased (e.g., represented by a lighter shade) for mask pixels within a predetermined or threshold distance of a facial landmark point or of a landmark shape generated based on facial landmark points.

Figure 18:
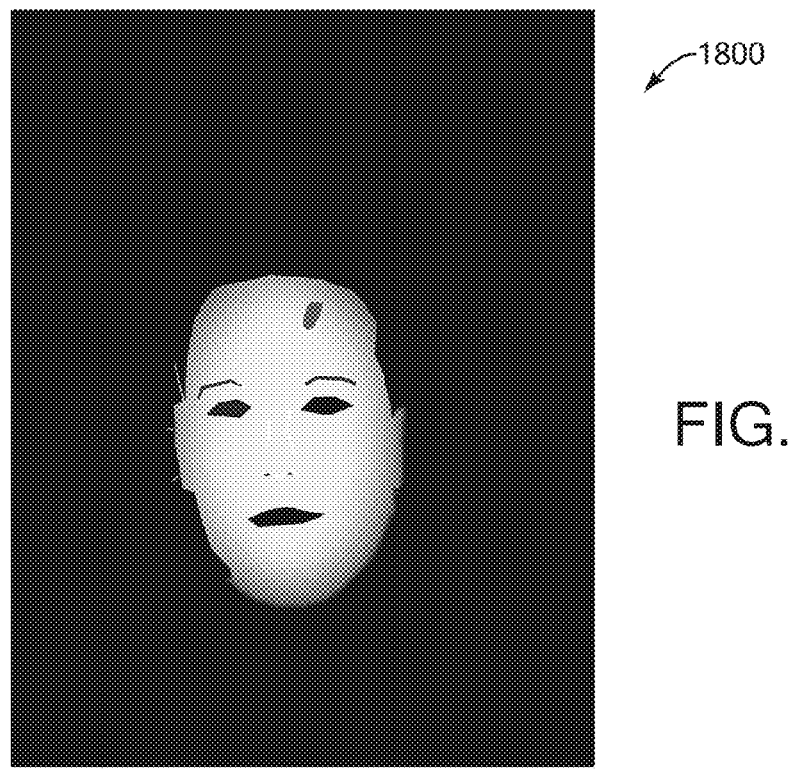
FIG. 18 is a diagrammatic illustration of an example resulting inferred confidence mask determined based on the posterior probability feature mask of FIG. 13 and the posterior probability non-feature mask of FIG. 17.

FIG. 18 shows an example resulting inferred confidence mask 1800 determined based on the posterior probability feature mask 1300 of FIG. 13 and the posterior probability non-feature mask 1700 of FIG. 17. In some implementations, as described above for block 606 of FIG. 6, a posterior likelihood ratio can be determined to provide the resulting inferred confidence mask 1800. For example, the ratio of the posterior probability feature mask 1300 to the posterior probability non-feature mask 1700 can determine the inferred confidence mask 1800. In some implementations, this ratio can increase the skin definition in the resulting confidence mask. For example, the skin pixels may be indicated in a shade that is lighter in resulting mask 1800 than in posterior probability skin mask 1300, indicating a more certain probability of skin resulting from the use of the ratio.

Various implementations and applications can use one or more features described herein. For example, masks for skin features such as facial skin, hand skin, arm skin, and/or leg skin can be determined using one or more described aspects or features, allowing modification to such skin features. Skin masks as described herein can be used to apply modifications to skin features appearing in multiple frames in video content. In some video applications, a skin feature found in one frame can be tracked and assumed to be the same in multiple successive frames, e.g., using optical flow and/or other techniques to estimate how particular pixels move between frames. Segmented regions and skin masks determined for one frame can be shifted in position as needed for successive frames and used without having to determine new regions and skin masks from the beginning of the process.

In some implementations, a spatial function and prior probability masks are not determined, and the distributions of color values can be determined based on segmented regions as described above. In some examples, the resulting inferred confidence skin mask can be determined based on the likelihood skin mask without the prior probability skin mask.

In some implementations, image features other than skin features can be detected, and image masks can be determined similarly using one or more features as described above for facial skin masks. For example, image recognition techniques that can detect animals, monuments, objects, landscape features, or other features in images can be used to estimate a spatial boundary and a prior probability mask for feature pixels and a prior probability mask for non-feature pixels similarly as described above, e.g., based on recognized image characteristics. Regions can be segmented relative to the recognized features, and distributions of color values determined for those regions. A posterior probability feature mask for feature pixels and a posterior probability non-feature mask for non-feature pixels can be determined based on the color value distributions and prior masks similarly as for skin features described above. A resulting inferred confidence mask can be determined based on the posterior feature mask and posterior non-feature mask, for example, similarly as described above.

Figure 19:
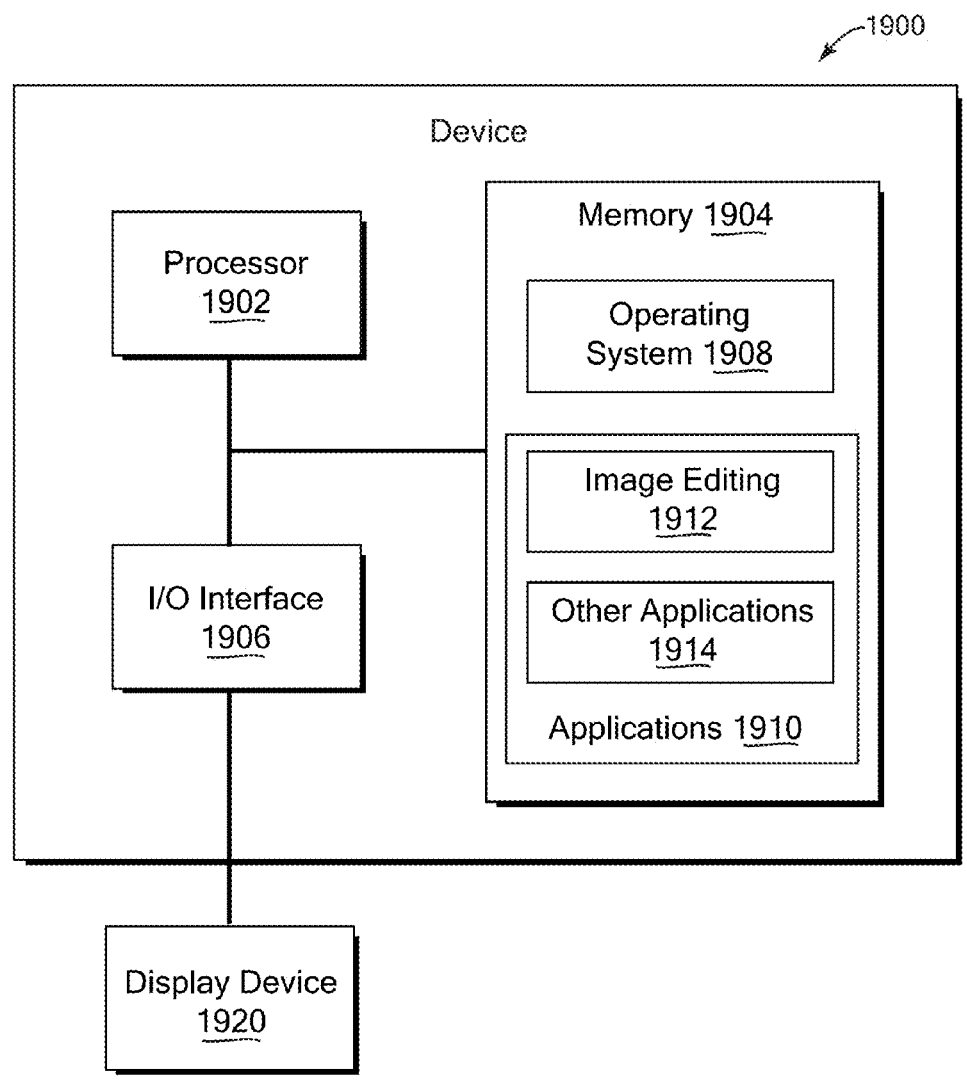
FIG. 19 is a block diagram of an example device which may be used for one or more implementations described herein.

FIG. 19 is a block diagram of an example device 1900 which may be used to implement one or more features described herein. In one example, device 1900 may be used to implement computer device used to implement a server device, e.g., server device 104 of FIG. 1, and perform appropriate method implementations described herein. Device 1900 can be any suitable computer system, server, or other electronic or hardware device. For example, the device 1900 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 1900 includes a processor 1902, a memory 1904, and input/output (I/O) interface 1906.

Processor 1902 can be one or more processors and/or processing circuits to execute program code and control basic operations of the device 1900. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1904 is typically provided in device 1900 for access by the processor 1902, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1902 and/or integrated therewith. Memory 1904 can store software operating on the server device 1900 by the processor 1902, including an operating system 1908 and one or more applications 1910, e.g., a graphics editing engine, web hosting engine, social networking engine, etc. In some implementations, applications 1910 can include instructions that enable processor 1902 to perform the functions described herein, e.g., some or all of the methods of FIGS. 2-6. For example, applications 1910 can include one or more image editing applications 1912, including an image editing program to receive user input, select input images, modify pixels of images (e.g., by applying edit operations to an input image), and provide output data causing display of the images on a display device of the device 1900. An image editing program, for example, can provide a displayed user interface responsive to user input to display selectable options/controls and images based on selected options. Other applications or engines 1914 can also or alternatively be included in applications 1910, e.g., media display applications, communication applications, web hosting engine or application, social networking engine or application, etc. Any of software in memory 1904 can alternatively be stored on any other suitable storage location or computer-readable medium. In addition, memory 1904 (and/or other connected storage device(s)) can store images (e.g., input images, pixel masks (feature masks and non-feature masks), etc.), facial landmark points and boundary shapes, parameters and factors, user preferences, and other instructions and data used in the features described herein. Memory 1904 and any other type of storage (magnetic disk, optical disk, magnetic tape, or other tangible media) can be considered "storage" or "storage devices."

I/O interface 1906 can provide functions to enable interfacing the server device 1900 with other systems and devices. For example, network communication devices, storage devices (e.g., memory and/or database 106), and input/output devices can communicate via interface 1906. In some implementations, the I/O interface can connect to interface devices including input devices (keyboard, pointing device, touchscreen, microphone, camera, scanner, etc.) and/or output devices (display device, speaker devices, printer, motor, etc.). Display device 1920 is one example of an output device that can be used to display content, e.g., one or more images provided in an image editing interface or other output application as described herein. Display device 1920 can be connected to device 1900 via local connections (e.g., display bus) and/or via networked connections and can be any suitable display device, some examples of which are described below.

For ease of illustration, FIG. 19 shows one block for each of processor 1902, memory 1904, I/O interface 1906, and software blocks 1908 and 1910. These blocks may represent one or more processors or processing circuitries, operating systems, memories, I/O interfaces, applications, and/or software modules. In other implementations, device 1900 may not have all of the components shown and/or may have other elements including other types of elements instead of, or in addition to, those shown herein. While server system 102 is described as performing operations as described in some implementations herein, any suitable component or combination of components of system 102 or similar system, or any suitable processor or processors associated with such a system, may perform the operations described.

A client device can also implement and/or be used with features described herein, e.g., client devices 120-126 shown in FIG. 1. Example client devices can be computer devices including some similar components as the device 1900, e.g., processor(s) 1902, memory 1904, and I/O interface 1906. An operating system, software and applications suitable for the client device can be provided in memory and used by the processor, e.g., image editing software, client group communication application software, etc. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 1920, for example, can be connected to (or included in) the device 1900 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods of FIGS. 2-4 and 6) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users are provided with one or more opportunities as described above to control whether programs or features collect user information (e.g., information about a user's social network, user characteristics (age, gender, profession, etc.), social actions or activities, a user's preferences, content created or submitted by a user, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user has control over how information is collected about the user and used by a server.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to determine a mask for an image, the method comprising:
  determining a spatial function for a detected feature depicted in the image, wherein the detected feature is a detected skin feature, wherein the spatial function indicates pixels of the image relative to a feature boundary estimated from the detected feature, wherein determining the spatial function includes determining a prior probability mask for the detected feature, wherein the prior probability mask is based on the feature boundary and indicates, for each of a first plurality of pixels of the image, an associated first probability that the pixel is a feature pixel;
  determining a respective color likelihood distribution for each region of a plurality of regions of the image based on one or more distributions of color values in each of the regions, wherein the regions include a feature region and a non-feature region;
  determining a confidence mask based on the spatial function and one or more of the color likelihood distributions, wherein the confidence mask indicates, for each of a second plurality of pixels of the image, an associated confidence that the pixel is a feature pixel, wherein the confidence mask is based on a posterior probability mask, wherein the posterior probability mask is based on the prior probability mask and the one or more color likelihood distributions, wherein the posterior probability mask indicates, for each of the second plurality of pixels of the image, an associated second probability that the pixel is a feature pixel,
  wherein determining the confidence mask is based on a posterior feature mask and a posterior non-feature mask, and includes:
    determining the posterior feature mask based on the color likelihood distribution for the feature region, wherein the posterior feature mask indicates, for each of a third plurality of pixels of the image, an associated third probability that the pixel is a feature pixel; and
    determining the posterior non-feature mask based on at least one of the one or more color likelihood distributions for the non-feature region, wherein the posterior non-feature mask indicates, for each of a fourth plurality of pixels of the image, an associated fourth probability that the pixel is not a feature pixel; and
  applying a modification to one or more pixels of the image using the confidence mask.

2. The method of claim 1, further comprising blurring the spatial function, wherein determining the confidence mask is based on the blurred spatial function.

3. The method of claim 1, wherein the detected skin feature is facial skin included in a detected face, wherein the detected face includes one or more detected facial landmarks, wherein the feature boundary is a face boundary estimated based on the one or more detected facial landmarks.

4. The method of claim 3, further comprising determining the face boundary using a machine learning technique that determines the face boundary based on positions of the one or more detected facial landmarks, wherein the machine learning technique is trained with a plurality of training images having face boundaries indicated.

5. The method of claim 1, wherein determining a respective color likelihood distribution for each region includes:
  determining a region segmentation of the image based on the feature boundary, wherein the region segmentation indicates a plurality of regions including the feature region and the non-feature region of the image;
  determining the one or more distributions of color values for pixels of the image in each of the plurality of regions; and
  determining the respective color likelihood distribution for each of the plurality of regions based on one or more of the distributions of color values for the regions.

6. The method of claim 1, wherein the distributions of color values include histograms, and further comprising normalizing the histograms for the regions.

7. The method of claim 1 further comprising blurring one or more of the distributions of color values.

8. The method of claim 7 wherein blurring the distributions of color values includes blurring values of the one or more distributions along an axis for which color value for different color channels are approximately equal.

9. The method of claim 1 wherein determining the posterior probability mask includes multiplying the prior probability mask with at least one of the color likelihood distributions.

10. The method of claim 1 wherein determining the confidence mask includes determining a ratio of the posterior feature mask to the posterior non-feature mask.

11. The method of claim 1 wherein the detected feature is facial skin included in a detected face, and wherein the plurality of regions include one or more facial landmark regions different than the feature region, wherein the one or more facial landmark regions include at least one of: a mouth region, an eye region, and an eyebrow region, and wherein determining the respective color likelihood distribution for each region includes determining a respective color likelihood distribution for each of the one or more facial landmark regions.

12. The method of claim 11, wherein the posterior non-feature mask is based on multiplying the prior probability mask with a combination of the color likelihood distributions for the non-feature region and for the one or more facial landmark regions.

13. A system to determine a mask for an image, the system comprising:

a storage device; and at least one processor operative to access the storage device and configured to:

determine a respective color likelihood distribution for each region of a plurality of regions of the image based on one or more distributions of color values in each of the regions, wherein the regions include a feature region estimated to depict at least a portion of an image feature and a non-feature region estimated to not depict the image feature;

determine a probability feature mask at least based on the color likelihood distribution for the feature region, wherein the probability feature mask indicates, for each of a first plurality of pixels of the image, an associated probability that the pixel is a feature pixel;

determine a probability non-feature mask at least based on the color likelihood distribution for the non-feature region, wherein the probability non-feature mask indicates, for each of a second plurality of pixels of the image, an associated probability that the pixel is not a feature pixel;

determine a resulting confidence mask based on the probability feature mask and the probability non-feature mask; and apply a modification to one or more pixels of the image using the resulting confidence mask.

14. The system of claim 13 wherein the one or more distributions of color values include histograms, and wherein the at least one processor is further configured to blur each the histograms.

15. The system of claim 13 wherein the image feature is facial skin included in a detected face, and wherein the plurality of regions include one or more facial landmark regions, wherein the one or more facial landmark regions include at least one of: a mouth region, an eye region, and an eyebrow region, and wherein the at least one processor is configured to determine a respective color likelihood distribution for each of the one or more facial landmark regions, and wherein the at least one processor is configured to determine the probability non-feature mask for the facial skin at least based on the color likelihood distribution for the non-feature region and the color likelihood distributions for the one or more facial landmark regions.

16. A non-transitory computer readable medium having stored thereon software instructions to determine a skin mask for an image and, when executed by a processor, cause the processor to perform operations including:

determining a prior probability mask for a detected skin feature depicted in the image, wherein the prior probability mask is based on a skin feature boundary estimated from the detected skin feature, and wherein the prior probability mask indicates, for each of a first plurality of pixels in the image, an associated first probability that the pixel is a skin feature pixel;

determining a respective color likelihood distribution for each region of a plurality of regions of the image based on one or more distributions of pixel color values in each of the regions, wherein the regions include a skin feature region and a non-feature region, wherein the one or more distributions of pixel color values include one or more histograms;

blurring at least one histogram of the one or more histograms such that a range of colors represented in the at least one histogram for at least one of the plurality of regions is greater than before the blurring;

determining a posterior probability mask for the detected skin feature based on the prior probability mask and the color likelihood distributions, wherein the posterior probability mask indicates, for each of a second plurality of pixels of the image, an associated second probability that the pixel is a skin feature pixel; and applying a modification to one or more pixels of the image based on the posterior probability mask.

17. The computer readable medium of claim 16 wherein the detected skin feature is included in a detected face, and wherein the plurality of regions include one or more facial landmark regions different than the skin feature region, wherein the one or more facial landmark regions include at least one of: a mouth region, an eye region, and an eyebrow region, and wherein determining the respective color likelihood distribution for each region includes determining a respective color likelihood distribution for each of the one or more facial landmark regions.

18. The computer readable medium of claim 17 wherein the posterior probability mask is based on a posterior feature mask and a posterior non-feature mask, wherein the posterior non-feature mask is based on multiplying the prior probability mask with a combination of the color likelihood distributions for the non-feature region and for the one or more facial landmark regions.

19. The computer readable medium of claim 16 wherein determining the posterior probability mask for the detected skin feature is based on a posterior feature mask and a posterior non-feature mask, and the operations further include:

determining the posterior feature mask based on the color likelihood distribution for the skin feature region and indicating, for each of a third plurality of pixels of the image, an associated third probability that the pixel is a skin feature pixel; and determining the posterior non-feature mask based on at least one of the one or more color likelihood distributions for the non-feature region and indicating, for each of a fourth plurality of pixels of the image, an associated fourth probability that the pixel is not a skin feature pixel.

20. The computer readable medium of claim 16 wherein determining the posterior probability mask includes multiplying the prior probability mask with at least one of the color likelihood distributions.

* * * * *